United States Patent
Davydov et al.

(10) Patent No.: US 9,749,892 B2
(45) Date of Patent: *Aug. 29, 2017

(54) PERIODIC CHANNEL STATUS INFORMATION (CSI) REPORTING FOR ENHANCED INTERFERENCE MANAGEMENT AND TRAFFIC ADAPTATION (EIMTA) SYSTEMS WITH CSI SUBFRAME SETS

(71) Applicant: Intel Corporation, Santa Clara, CA (US)

(72) Inventors: Alexei Davydov, Nizhny Novgorod (RU); Alexey Khoryaev, Nizhny Novgorod (RU); Sergey Panteleev, Nizhny Novgorod (RU); Seunghee Han, San Jose, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/700,428

(22) Filed: Apr. 30, 2015

(65) Prior Publication Data
US 2015/0237521 A1    Aug. 20, 2015

Related U.S. Application Data

(63) Continuation of application No. 14/495,641, filed on Sep. 24, 2014, now Pat. No. 9,571,251.
(Continued)

(51) Int. Cl.
H04W 4/00 (2009.01)
H04W 24/10 (2009.01)
(Continued)

(52) U.S. Cl.
CPC ....... *H04W 24/10* (2013.01); *H04W 72/0413* (2013.01); *H04W 74/0808* (2013.01)

(58) Field of Classification Search
CPC combination set(s) only.
See application file for complete search history.

(56) References Cited

U.S. PATENT DOCUMENTS 8,995,373 B2* 3/2015 Yang .................... H04B 7/0626
370/329
9,060,361 B2  6/2015 Nam et al.
(Continued)

OTHER PUBLICATIONS

Catt, CSI feedback in TDD eIMTA, 3GPP TSG RAN WG1 Meeting #74bis, 3 pages, Oct. 2013.*
(Continued)

*Primary Examiner* — Frank Duong
(74) *Attorney, Agent, or Firm* — Schwegman Lundberg & Woessner, P.A.

(57) ABSTRACT

Wireless device, method, and computer readable media are disclosed for determining which channel status information (CSI) report of a user equipment (UE) to drop from a physical uplink control channel (PUCCH) packet. The method may include determining that a first CSI report and a second CSI report are to be sent in the PUCCH, where the first CSI report has a first reporting type and a first CSI sub-frame set, and the second CSI report has a second reporting type and a second CSI sub-frame set. The method may include determining to drop the first CSI report if the first CSI sub-frame set has a second lower priority than the second CSI sub-frame set. The determination to drop may be further based on a CSI processor index, serving cell index, and the CSI report priority.

34 Claims, 14 Drawing Sheets

Related U.S. Application Data

(60) Provisional application No. 61/933,863, filed on Jan. 30, 2014.

(51) Int. Cl.
  *H04W 72/04* (2009.01)
  *H04W 74/08* (2009.01)

(56) References Cited

U.S. PATENT DOCUMENTS

| | | | |
|---|---|---|---|
| 9,161,254 B2 | 10/2015 | Han et al. | |
| 9,277,471 B2 | 3/2016 | He et al. | |
| 2012/0201207 A1* | 8/2012 | Liu | H04W 24/10 370/329 |
| 2012/0220286 A1* | 8/2012 | Chen | H04W 24/10 455/422.1 |
| 2013/0114455 A1 | 5/2013 | Yoo et al. | |
| 2013/0258874 A1* | 10/2013 | Khoshnevis | H04L 5/0057 370/252 |
| 2015/0124663 A1* | 5/2015 | Chen | H04L 5/0053 370/278 |
| 2015/0155928 A1 | 6/2015 | Seo et al. | |
| 2015/0200754 A1 | 7/2015 | Sayana et al. | |
| 2016/0301515 A1* | 10/2016 | Ouchi | H04L 5/0057 |

OTHER PUBLICATIONS

U.S. Appl. No. 14/495,641, filed Sep. 24, 2014, Periodic Channel Status Information (CSI) Reporting For Enhanced Interference Management and Traffic Adaptation (EIMTA) Systems With CSI Subframe Sets.

"3rd Generation Partnership Project;Technical Specification Group Radio Access Network;Evolved Universal Terrestrial Radio Access (E-UTRA); Physical layer procedures (Release 12)", 3GPP TS 36.213 V12.5.0, (Mar. 2015), 239 pages.

"U.S. Appl. No. 14/495,641, Examiner Interview Summary mailed Jul. 28, 2016", 3 pgs.

"U.S. Appl. No. 14/495,641, Non Final Office Action mailed Mar. 22, 2016", 9 pgs.

"U.S. Appl. No. 14/495,641, Notice of Allowance mailed Oct. 4, 2016", 7 pgs.

"U.S. Appl. No. 14/495,641, Response filed Jul. 22, 2016 to Non Final Office Action mailed Mar. 22, 2016", 12 pg.

"U.S. Appl. No. 14/495,641, Response filed Jul. 22, 2016 to Non-Final Office Action mailed Mar. 22, 2016", 12 pgs.

* cited by examiner

| PUCCH Reporting Type | Reported | Mode State | PUCCH Reporting Modes | | | |
|---|---|---|---|---|---|---|
| | | | Mode 1-1 (bits/BP) | Mode 2-1 (bits/BP) | Mode 1-0 (bits/BP) | Mode 2-0 (bits/BP) |
| 1 | SUB-BAND CQI | RI = 1 | NA | 4+L | NA | 4+L |
| | | RI > 1 | NA | 7+L | NA | 4+L |
| 1a | SUB-BAND CQI/SEC. PMI | 8 antenna ports RI=1 | NA | 8+L | NA | NA |
| | | 8 ant. ports 1<RI<5 | NA | 8+L | NA | NA |
| | | 8 antenna ports RI>4 | NA | 7+L | NA | NA |
| 2 | Wideband CQI/PMI | 2 antenna ports RI=1 | 6 | 6 | NA | NA |
| | | 4 antenna ports RI=1 | 8 | 8 | NA | NA |
| | | 2 antenna ports RI=1 | 8 | 8 | NA | NA |
| | | 4 antenna ports RI=1 | 11 | 11 | NA | NA |
| 2a | Wideband First PMI | 8 antenna ports RI>3 | NA | 4 | NA | NA |
| | | 8 ant. ports 2<RI>3 | NA | 2 | NA | NA |
| | | 8 antenna ports RI=8 | NA | 0 | NA | NA |
| 2b | Wideband CQI/second PMI | 8 antenna ports RI=1 | 8 | 8 | NA | NA |
| | | 8 ant. ports 1<RI<4 | 8 | 8 | NA | NA |
| | | 8 ant. Ports RI=4 | 10 | 10 | NA | NA |
| | | 8 ant. Ports RI>4 | 7 | 7 | NA | NA |
| 2c | Wideband CQI/first PMI/second PMI | 8 antenna ports RI=1 | 8 | NA | NA | NA |
| | | 8 ant. ports 1<RI<=4 | 11 | NA | NA | NA |
| | | 8 ant. ports 4<RI<=7 | 9 | NA | NA | NA |
| | | 8 antenna ports RI=8 | 7 | NA | NA | NA |
| 3 | RI | 2/4 ant. ports, 2-layer spatial multiplexing | 1 | 1 | 1 | 1 |
| | | 8 ant. ports, 2-layer spatial multiplexing | 1 | NA | NA | NA |
| | | 4 ant. ports, 4-layer spatial multiplexing | 2 | 2 | 2 | 2 |
| | | 8 ant. ports, 4-layer spatial multiplexing | 2 | NA | NA | NA |
| | | 8-layer s. multiplexing | 3 | NA | NA | NA |

*FIG. 2*

PERIODIC CHANNEL STATUS INFORMATION (CSI) REPORTING FOR ENHANCED INTERFERENCE MANAGEMENT AND TRAFFIC ADAPTATION (EIMTA) SYSTEMS WITH CSI SUBFRAME SETS

PRIORITY CLAIM

This application is a continuation of U.S. patent application Ser. No. 14/495,641, filed Sep. 24, 2014, which claims the benefit of priority under 35 USC 119(e) to U.S. Provisional Patent Application Ser. No. 61/933,863, filed Jan. 30, 2014, each of which is incorporated herein by reference in its entirety.

TECHNICAL FIELD

Embodiments pertain to wireless communications. Some embodiments relate to reporting channel status information and determining which channel status information report to transmit in 3GPP-LTE networks.

BACKGROUND

User equipment (UE) in long term evolution (LTE) may communicate with the radio access network (RAN) in different ways. Often the RAN needs feedback regarding the quality of the communications between the UE and the RAN.

The RAN may be able to improve or change the communications between the UE and the RAN based on the feedback from the UE. For example, downlink scheduling (assigning control and shared channel resource blocks to UEs within a cell) may be performed at an eNodeB (part of the RAN) based on channel quality information fed back from the UEs to the eNodeB.

However, the number of packets the UE can transmit to the RAN is often limited. Thus, there are general needs for improved feedback reporting to an LTE network from the UE.

BRIEF DESCRIPTION OF THE DRAWINGS

FIG. 2 illustrates an example for Long-Term Evolution (LTE) of the physical uplink control channel (PUCCH) reporting type and payload size per PUCCH reporting mode and mode state;

DETAILED DESCRIPTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Figure 1:
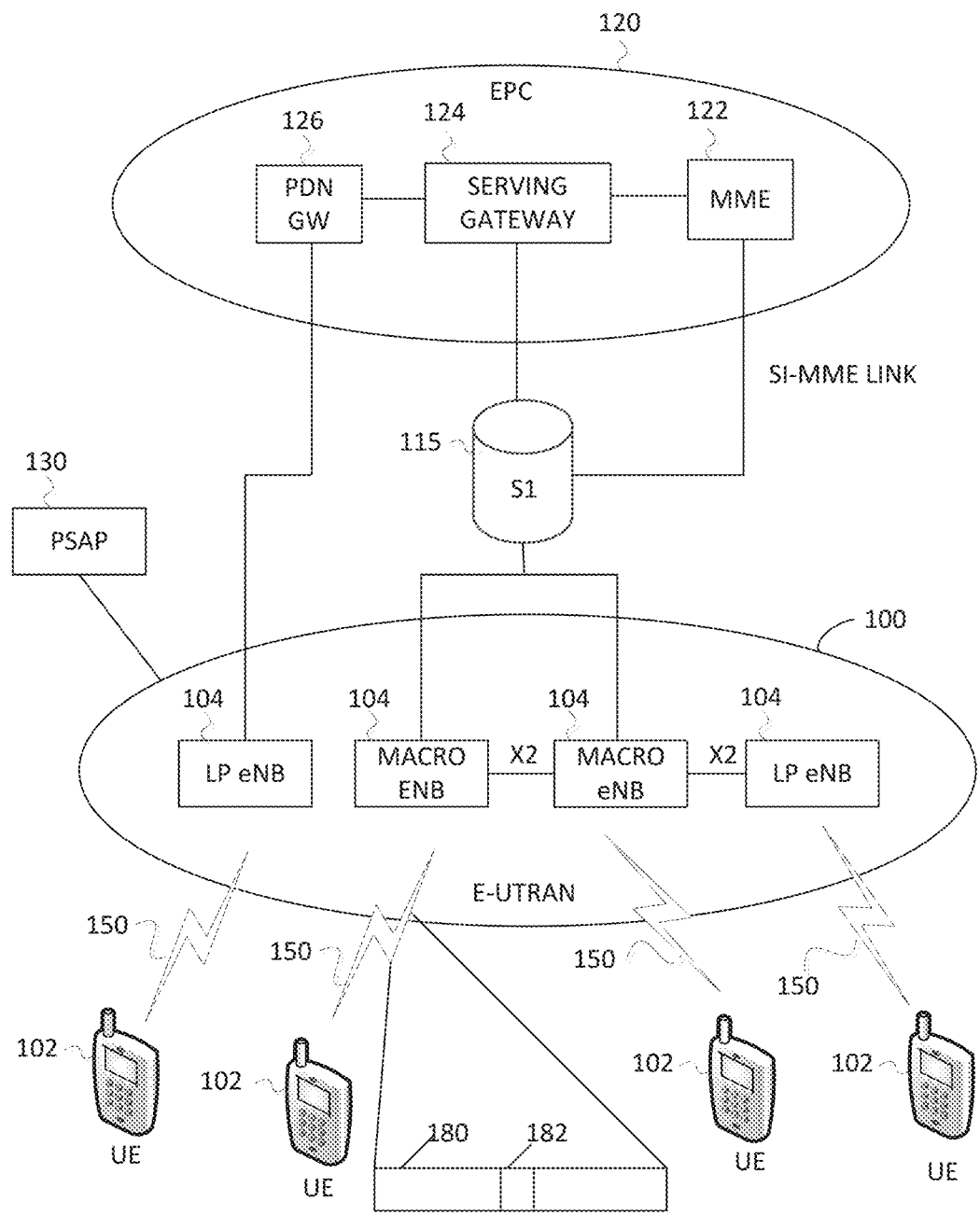
FIG. 1 shows a portion of an end-to-end network architecture of an LTE network with various components of the network in accordance with some embodiments.

FIG. 1 shows a portion of an end-to-end network architecture of an LTE network with various components of the network in accordance with some embodiments. The network comprises a radio access network (RAN) 100 (e.g., as depicted, the E-UTRAN or evolved universal terrestrial radio access network) and the core network 120 (e.g., shown as an evolved packet core (EPC)) coupled together through an S1 interface 115. For convenience and brevity's sake, only a portion of the core network 120, as well as the RAN 100, is shown.

The core network 120 includes mobility management entity (MME) 122, serving gateway (serving GW) 124, and packet data network gateway (PDN GW) 126. The RAN 100 includes enhanced node B's (eNBs) 104 (which may operate as base stations) for communicating with UE 102. The eNBs 104 may include macro eNBs and low power (LP) eNBs. The UE 102 and eNBs 104 are transmitting and receiving communications 150. The UE 102 is transmitting a physical uplink control channel (PUCCH) 180, which may in LTE include a channel status information (CSI) report 182 that provides feedback to the eNBs 104 regarding the communications 150. In example embodiments, the PUCCH 180 may be in accordance with one or more specifications such as 3GPP LTE specification.

The MME 122 is similar in function to the control plane of legacy Serving GPRS Support Nodes (SGSN). The MME 122 manages mobility aspects in access such as gateway selection and tracking area list management. The serving GW 124 terminates the interface toward the RAN 100, and routes data packets between the RAN 100 and the core network 120. In addition, it may be a local mobility anchor point for inter-eNB handovers and also may provide an anchor for inter-3GPP mobility. Other responsibilities may include lawful intercept, charging, and some policy enforcement. The serving GW 124 and the MME 122 may be implemented in one physical node or separate physical nodes. The PDN GW 126 terminates an SGi interface toward the packet data network (PDN). The PDN GW 126 routes data packets between the core network 120 (an EPC network here) and the external PDN, and may be a key node for policy enforcement and charging data collection. It may also provide an anchor point for mobility with non-LTE accesses. The external PDN can be any kind of IP network, as well as an IP Multimedia Subsystem (IMS) domain. The PDN GW 126 and the serving GW 124 may be implemented in one physical node or separated physical nodes.

The eNBs 104 (macro and micro) terminate the air interface protocol and may be the first point of contact for a UE 102. In some embodiments, an eNB 104 may fulfill various logical functions for the RAN 100 including but not limited to RNC (radio network controller functions) such as radio bearer management, uplink and downlink dynamic radio resource management or control (RRC) and data packet scheduling, and mobility management. In some cases the RRC functions are handled by another part of the network 100. In accordance with embodiments, UEs 102 may be configured to communicate OFDM communication signals with an eNB 104 over a multicarrier communication channel in accordance with an OFDMA communication technique. The OFDM signals may comprise a plurality of orthogonal subcarriers.

The S1 interface 115 is the interface that separates the RAN 100 and the core network 120, which may be an EPC network. It is split into two parts: the S1-U, which carries traffic data between the eNBs 104 and the serving GW 124, and the S1-MME, which is a signaling interface between the eNBs 104 and the MME 122. The X2 interface is the interface between eNBs 104. The X2 interface comprises two parts, the X2-C and X2-U. The X2-C is the control plane interface between the eNBs 104, while the X2-U is the user plane interface between the eNBs 104.

With cellular networks, LP cells are typically used to extend coverage to indoor areas where outdoor signals do not reach well, or to add network capacity in areas with very dense phone usage, such as train stations. As used herein, the term low power (LP) eNB refers to any suitable relatively low power eNB for implementing a narrower cell (narrower than a macro cell) such as a femtocell, a picocell, or a micro cell. Femtocell eNBs are typically provided by a mobile network operator to its residential or enterprise customers. A femtocell is typically the size of a residential gateway or smaller and generally connects to the user's broadband line. Once plugged in, the femtocell connects to the mobile operator's mobile network and provides extra coverage in a range of typically 30 to 50 meters for residential femtocells. Thus, a LP eNB might be a femtocell eNB since it is coupled through the PDN GW 126. Similarly, a picocell is a wireless communication system typically covering a small area, such as in-building (offices, shopping malls, train stations, etc.), or more recently in-aircraft. A picocell eNB can generally connect through the X2 link to another eNB such as a macro eNB through its base station controller (BSC) functionality. Thus, LP eNB may be implemented with a picocell eNB since it is coupled to a macro eNB via an X2 interface. Picocell eNBs or other LP eNBs may incorporate some or all functionality of a macro eNB. In some cases, this may be referred to as an access point base station or enterprise femtocell.

In some embodiments, a downlink resource grid may be used for downlink transmissions from an eNB 104 to a UE 102. The grid may be a time-frequency grid, called a resource grid, which is the physical resource in the downlink in each slot. Such a time-frequency plane representation is a common practice for OFDM systems, which makes it intuitive for radio resource allocation. Each column and each row of the resource grid correspond to one OFDM symbol and one OFDM subcarrier, respectively. The duration of the resource grid in the time domain corresponds to one slot in a radio frame. The smallest time-frequency unit in a resource grid is denoted as a resource element. Each resource grid comprises a number of resource blocks, which describe the mapping of certain physical channels to resource elements. Each resource block comprises a collection of resource elements, and in the frequency domain, this represents the smallest quanta of resources that currently can be allocated. There are several different physical downlink channels that are conveyed using such resource blocks. With particular relevance to this disclosure, two of these physical downlink channels are the physical downlink shared channel and the physical downlink control channel.

The physical downlink shared channel (PDSCH) carries user data and higher-layer signaling to a UE 102 (FIG. 1). The physical downlink control channel (PDCCH) carries information about the transport format and resource allocations related to the PDSCH channel, among other things. It also informs the UE 102 about the transport format, resource allocation, and H-ARQ information related to the uplink shared channel. Typically, downlink scheduling (assigning control and shared channel resource blocks to UEs 102 within a cell) is performed at the eNB 104 based on channel quality information fed back from the UEs 102 to the eNB 104, and then the downlink resource assignment information is sent to a UE 102 on the control channel (PDCCH) used for (assigned to) the UE 102.

The PDCCH uses CCEs (control channel elements) to convey the control information. Before being mapped to resource elements, the PDCCH complex-valued symbols are first organized into quadruplets, which are then permuted using a sub-block inter-leaver for rate matching. Each PDCCH is transmitted using one or more of these control channel elements (CCEs), where each CCE corresponds to nine sets of four physical resource elements known as resource element groups (REGs). Four QPSK symbols are mapped to each REG. The PDCCH can be transmitted using one or more CCEs, depending on the size of DCI and the channel condition. There may be four or more different PDCCH formats defined in LTE with different numbers of CCEs (e.g., aggregation level, L=1, 2, 4, or 8).

The UE 102 may transmit a PUCCH 180, which may in LTE include a CSI report 182. In example embodiments, the PUCCH 180 may carry uplink control information (UCI) which may include the CSI reports 182, Hybrid Automatic Retransmission request (HARM) ACKnowledgment/Negative ACKnowledgment (ACK/NACK) and uplink scheduling requests (SR). In LTE the PUCCH 180 has different formats. In example embodiments, the UE 102 is configured to generate CSI reports 182 which may be reports on the channel status of different communications 150. The UE 102 can provide aperiodic CSI 182 reporting using the PUSCH or periodic CSI reports 182 using PUCCH 180. The PUCCH 180 can support multiple formats (i.e., PUCCH 180 format) with various modulation and coding schemes (MCS), as shown for LTE in Table 1. For example, PUCCH 180 format 3 can be used to convey multi-bit HARQ-ACK, which can be used for carrier aggregation.

TABLE 1

PUCCH FORMAT TYPES

| PUCCH FORMAT | MODULATION SCHEME | NUMBER OF BITS PER SUBFRAME |
|---|---|---|
| 1 | N/A | N/A |
| 1a | BPSK | 1 |
| 1b | QPSK | 2 |
| 2 | QPSK | 20 |
| 2a | QPSK + BPSK | 21 |
| 2b | QPSK + QPSK | 22 |
| 3 | QPSK | 48 |

In example embodiments the UE 102 may use frequency hopping to send the PUCCH 180. The CSI 182 report can include a channel quality indicator (CQI), a precoding matrix indicator (PMI), a precoding type indicator (PTI), and/or rank indication (RI) reporting type. The CQI can be signaled by a UE 102 to the eNodeB 104 to indicate a suitable data rate, such as a modulation and coding scheme (MCS) value, for downlink transmissions, which can be based on a measurement of the received downlink signal to interference plus noise ratio (SINR) and knowledge of the UE's 102 receiver characteristics. The PMI can be a signal fed back by the UE 102 to support multiple-input multiple-output (MIMO) operation. The PMI can correspond to an index of the precoder (within a codebook shared by the UE 102 and eNodeB 104), which can maximize an aggregate number of data bits which can be received across all downlink spatial transmission layers. PTI can be used to distinguish a type of precoding used in PMI reports. The RI can be signaled to the eNB 104 by UEs 102 configured for PDSCH transmission modes 3 (e.g., open-loop spatial multiplexing) and 4 (e.g., closed-loop spatial multiplexing), 8, 9 and 10. RI can correspond to a number of useful transmission layers for spatial multiplexing (based on the UE's 102 estimate of the downlink channel), enabling the eNB 104 to adapt the PDSCH transmissions accordingly.

The granularity of a CQI report can be divided into three levels: wideband, UE 102 selected subband, and higher layer configured subband. The wideband CQI report can provide one CQI value for an entire downlink system bandwidth. The UE 102 selected subband CQI report can divide the system bandwidth into multiple subbands, where the UE 102 can select a set of preferred subbands (the best M subbands), then report one CQI value for the wideband and one differential CQI value for the set (assuming transmission only over the selected M subbands). The higher layer configured subband CQI report can provide a highest granularity. In the higher layer configured subband CQI report, the wireless device can divide the entire system bandwidth into multiple subbands, then reports one wideband CQI value and multiple differential CQI values, such as one for each subband.

The UCI carried by the PUCCH 180 can use different PUCCH reporting types (or CQI/PMI and RI reporting types) to specify which CSI reports are being transmitted. For example, PUCCH reporting Type 1 can support CQI feedback for UE 102 selected sub-bands; Type 1a can support subband CQI and second PMI feedback; Type 2, Type 2b, and Type 2c can support wideband CQI and PMI feedback; Type 2a can support wideband PMI feedback; Type 3 can supports RI feedback; Type 4 can supports wideband CQI; Type 5 can support RI and wideband PMI feedback; and Type 6 can support RI and PTI feedback. Different CSI report 182 components can be included based on the PUCCH 180 reporting type. For example, RI can be included in PUCCH 180 reporting types 3, 5, or 6. Wideband PTI can be included in PUCCH 180 reporting type 6. Wideband PMI can be included in PUCCH 180 reporting types 2a or 5. Wideband CQI can be included in PUCCH 180 reporting types 2, 2b, 2c, or 4. Subband CQI can be included in PUCCH 180 reporting types 1 or 1a. The CQI/PMI and RI (PUCCH 180) reporting types with distinct periods and offsets can be supported for the PUCCH CSI reporting modes illustrated by the table in FIG. 2. FIG. 2 illustrates an example for LTE of the PUCCH 180 reporting type and payload size per PUCCH 180 reporting mode and mode state. The CSI report 182 information reported can vary based on the downlink transmission scenarios used. The various scenarios for the downlink can be reflected in different transmission modes (TMs).

For example, in LTE, TM 1 can use a single transmit antenna; TM 2 can use transmit diversity; TM 3 can use open loop spatial multiplexing with cyclic delay diversity (CDD); TM 4 can use closed loop spatial multiplexing; TM 5 can use multi-user MIMO (MU-MIMO); TM 6 can use closed loop spatial multiplexing using a single transmission layer; TM 7 can use beam forming with UE-specific RS; TM 8 can use single or dual layer beamforming with UE-specific RS; and TM 9 can use a multilayer (up to 8) transmission to support single user MIMO (SU-MIMO) or multi user MIMO (MU-MIMO).

In an example embodiment, TM 10 can be used for coordinated multipoint (CoMP) signaling, such as joint processing (JP), dynamic point selection (DPS), and/or coordinated scheduling/coordinated beamforming (CS/CB) or combinations thereof.

Each transmission mode can use different PUCCH 180 CSI report 182 reporting modes, where each PUCCH 180 CSI report 182 reporting mode can represent different CQI and PMI feedback types, as shown for LTE in Table 2.

TABLE 2

| | | PMI FEEDBACK TYPE | |
|---|---|---|---|
| | | NO PMI | SINGLE PMI |
| PUCCH CQI FEEDBACK TYPE | WIDEBAND (WIDEBAND CQI) | MODE 1-0 | MODE 1-1 |
| | UE SELECTED (SUBBAND CQI) | MODE 2-0 | MODE 2-1 |

For example, in LTE, TMs 1, 2, 3, and 7 can use PUCCH CSI reporting modes 1-0 or 2-0; TMs 4, 5, and 6 can use PUCCH CSI reporting modes 1-1 or 2-1; TM 8 can use PUCCH CSI reporting modes 1-1 or 2-1 if the UE is configured with PMI/RI reporting, or PUCCH CSI reporting modes 1-0 or 2-0 if the UE is configured without PMI/RI reporting; and TMs 9 and 10 can use PUCCH CSI reporting modes 1-1 or 2-1 if the UE is configured with PMI/RI reporting and number of CSI-RS ports is greater than one, or PUCCH CSI reporting modes 1-0 or 2-0 if the UE is configured without PMI/RI reporting or number of CSI-RS ports is equal to one. Based on the downlink transmission scheme (e.g., transmission mode), a UE can generate more CSI reports (e.g., CSI reports 182) than may be permitted to be transmitted to nodes (e.g., eNBs) without generating a signal collision or interference. The wireless device (e.g., UE 102) may make a determination on the CSI reports to keep and transmit and which CSI reports to drop or discard (and not transmit) to avoid a collision on a subframe.

One technique for providing bandwidth capacity to the UE 102 from the network 100 is carrier aggregation. In example embodiments, the LTE system may use carrier aggregation of multiple smaller bandwidths to form a virtual wideband channel between the UE 102 and the RAN 100. Each carrier is associated with a serving cell index, which may be called ServCellIndex in LTE. Each carrier may be referred to as a component carrier (CC). Each carrier may have a bandwidth. The component carriers may be continuous or non-continuous. Different frequency bands may be used, and the component carriers may be uplink (UL) or downlink (DL). The UE 102 may be scheduled to provide feedback for different serving cells at particular times, such as periodically.

A Coordinated MultiPoint (CoMP) system may also be used to reduce interference from neighboring nodes in both homogeneous networks and heterogeneous networks. In the CoMP system, the nodes, referred to as cooperating nodes, can also be grouped together with other nodes where the nodes from multiple cells can transmit signals to the wireless device and receive signals from the wireless device. The cooperating nodes can be nodes in the homogeneous network or macro nodes and/or lower power nodes (LPN) in the HetNet. CoMP operation can apply to downlink transmissions and uplink transmissions. Downlink CoMP operation can be divided into two categories: coordinated scheduling or coordinated beamforming (CS/CB or CS/CBF), joint processing or joint transmission (JP). With CS/CB, a given subframe can be transmitted from one cell to a given wireless device (e.g., UE), and the scheduling, including coordinated beamforming, is dynamically coordinated between the cells in order to control and/or reduce the interference between different transmissions.

For joint processing, joint transmission can be performed by multiple cells to a wireless device (e.g., UE), in which multiple nodes transmit at the same time using the same time and frequency radio resources in case of joint transmission and/or one node in case of dynamic point selection. Uplink CoMP operation can be divided into two categories: joint reception (JR) and coordinated scheduling and beamforming (CS/CB). With JR, a physical uplink shared channel (PUSCH) 10 transmitted by the wireless device (e.g., UE 102) can be received jointly at multiple points at a time frame. The set of the multiple points can constitute the CoMP reception point (RP) set, and can be included in part of UL CoMP cooperating set or in an entire UL CoMP cooperating set. JR can be used to improve the received signal quality. In CS/CB, user scheduling and precoding selection decisions can be made with coordination among points corresponding to the UL CoMP cooperating set. With CS/CB, PUSCH transmitted by the UE 102 can be received at one point. The UE 102 may be configured to provide feedback regarding different CSI processes. A CSI process index may identify which feedback is being provided. The UE 102 may be scheduled to provide feedback for CSI processes at particular times, such as periodically. The CSI-ProcessId-r11 may identify a CSI process index.

In accordance with embodiments, the UE 102 and eNB 104 may be configured for one or more of the example embodiments described herein for dropping CSI reports 182 based on one or more of the priority of the reporting type, the priority of the CSI sub-frame set, the priority of the serving cell index, and the priority of the CSI process index. The UE 102 may transmit the PUCCH 180 with the appropriate CSI report 182 while the eNB 104 may determine which CSI report 182 is in the PUCCH 180 by following the similar methods as the UE 102.

Figure 3:
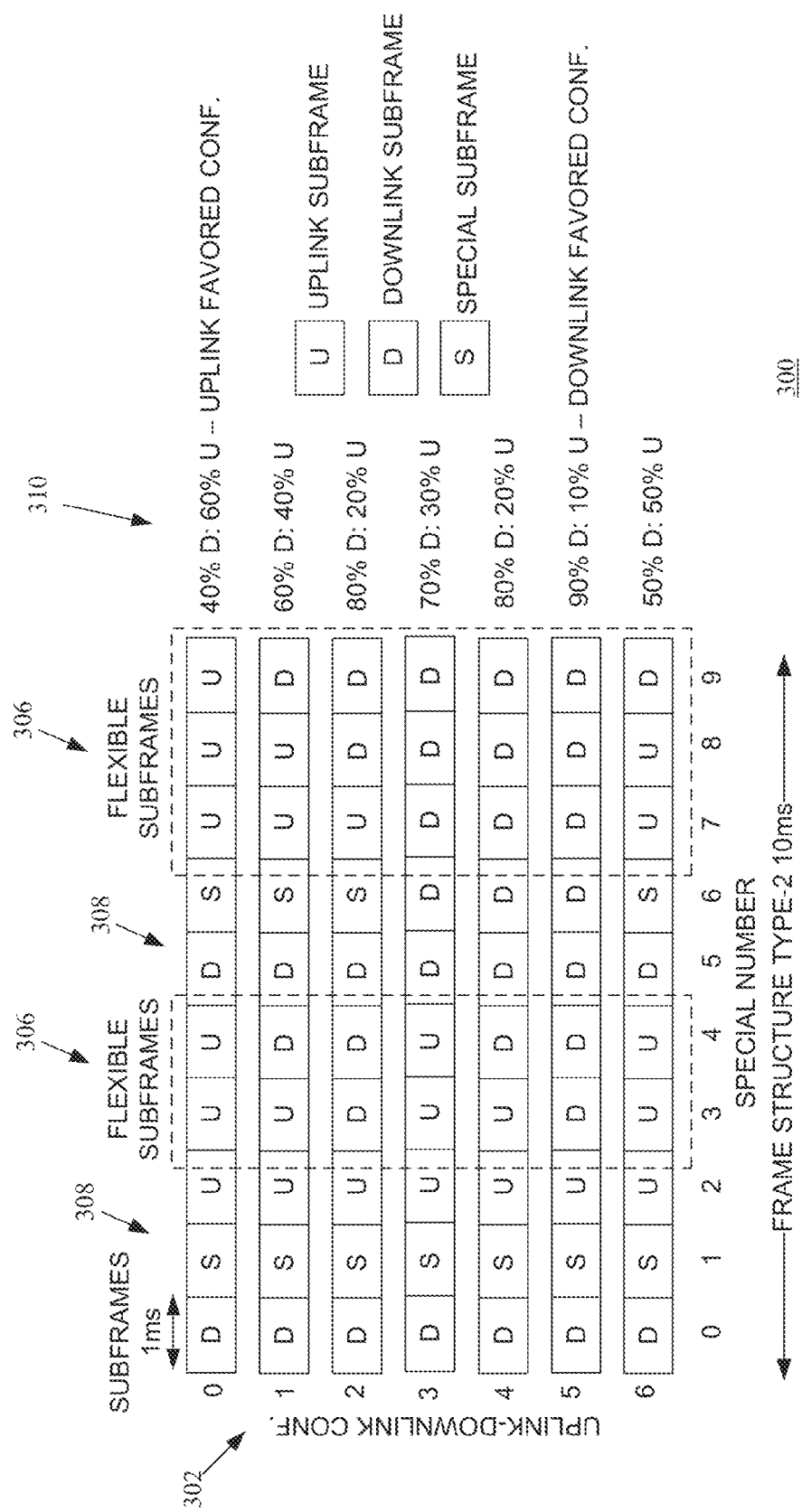
FIG. 3 illustrates enhanced interference management and traffic adaptation (eIMTA) according to some embodiments.

FIG. 3 illustrates enhanced interference management and traffic adaptation (eIMTA) 300 according to some embodiments. Illustrated in FIG. 3 are different uplink-downlink configurations 302 for sub-frames of radio frames along the vertical axis and sub-frames 304 along the horizontal axis. Indicated at the top of the uplink-downlink configurations 302 are flexible sub-frames 306 and static sub-frames 308, and on the right side is an indication of the relative percentage 310 of downlink sub-frames and up-link sub-frames for a configuration 302. For example, configuration one (1) indicates a downlink (D) percent of 60% and an uplink (U) percentage of 40% whereas configuration zero (0) indicates a D percentage of 40% and a U percentage of 60%.

In example embodiments, eIMTA 300 enables communications between the UE 102 (see FIG. 1) and the network 100, which may be an E-UTRAN or serving cell, to dynamically adapt to accommodate greater uplink or downlink traffic (not illustrated). The network 100, which may be an E-UTRAN or serving cell, may dynamically select an uplink-downlink configuration 302.

In some embodiments, eIMTA 300 is used with Time Division Duplex (TDD) systems to change the uplink (UL)/downlink (DL) relative percentages 310. In some embodiments, the eIMTA 300 conforms with one or more standards such as long-term evolution (LTE) Release 12.

In order to assist the network 100, which may be an E-UTRAN or serving cell, in selecting parameters for the transmitted signal (e.g., modulation and coding scheme, precoding matrix, etc.) on downlink sub-frames independent CSI reports (e.g., CSI reports 182) may be generated by the UE 102 where different sub-frames are considered with sub-frame restricted CSI measurements for different CSI sub-frame sets.

In example embodiments, CSI sub-frame sets are configured using a bitmaps to indicate which sub-frames 304 to include in the CSI report 182. In example embodiments, CSI reports 182 are generated using one of two CSI measurement sets. In example embodiments, each CSI measurement set for each network 100, which may be an E-UTRAN or serving cell, is independently configured by the radio resource control (RRC). In example embodiments, the CSI configuration may include periodicity, starting offset, etc. In example embodiments, one set may point to static DL sub-frames 308 (with fixed DL transmission) and another to flexible sub-frames 306 that can overlap with UL transmission direction. In example embodiments, the UE 102 and/or serving cell may be configured to resolve collisions with reporting CSI reports 182 based on the sub-frame set, which may have an index.

Figure 4:
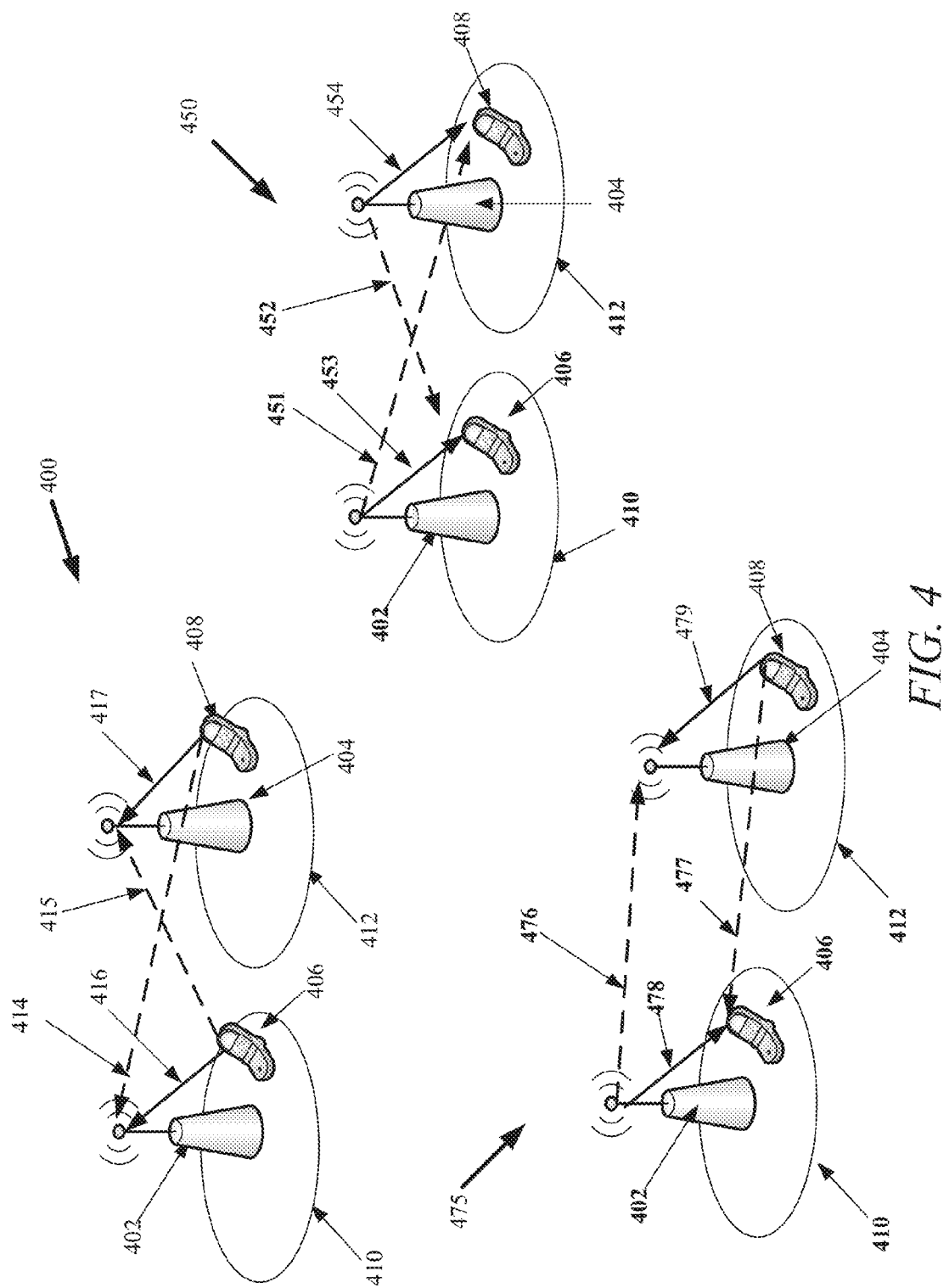
FIG. 4 illustrates interference in LTE Time-Division Duplex TDD eIMTA networks, according to example embodiments.

FIG. 4 illustrates interference in LTE TDD eIMTA networks, according to example embodiments. Illustrated in FIG. 4 is inter-cell uplink (UL) interference 400, inter-cell DL (DL) interference 450, and eIMTA interference 475.

Inter-cell UL interference 400 includes eNodeBs 402, 404; cell 1 410, cell 2 412; uplink transmissions 416, 417; and interference 414, 415. The interference for inter-cell UL interference 400 is interference 415 originating from the UE 406 to eNodeB 404 of cell 2 412, and interference 414 originating from UE 408 to eNodeB 402 of cell 1 410.

Inter-call DL interference 450 includes transmissions 453, 454, and interference 451, 452. The interference for inter-cell DL interference 450 is interference 451 originating from the eNodeB 402 of cell 410 to the UE 408 of cell 412, and interference 452 originating from eNodeB 404 of cell 2 412 to the UE 406 of cell 1 410.

The eIMTA interference 475 includes transmissions 478, 479 and interferences 476, 477. The interference for eIMTA interference 475 is interference 476 originating from the eNodeB 402 of cell 1 410 to eNodeB 404 of cell 2 412, and the interference 477 originating from UE 408 of cell 2 412 to the UE 406 of cell 1 410. In example embodiments, the same carrier may be used by cell 1 410 and cell 2 412. In example embodiments, the interference 477 is less than the interference 452.

In example embodiments, CSI measurement sets can be used together with carrier aggregation and CoMP. In example embodiments, the CSI priorities in case of collision between CSI reports (e.g., CSI reports 182) with PUCCH (e.g., PUCCH 180) reporting types of the same priority are disclosed.

In example embodiments, when the serving cell eNB 104 and UE 102 are in transmission mode 1-9, and the UE 102 is configured with the higher layer parameter tddModeA-Config-r12, which indicates eIMTA, for the serving cell with the UE 102 configured with CSI subframe sets $C_{CSI,0}$ and $C_{CSI,1}$; then if there is a collision between CSI reports with the same serving cell and with PUCCH reporting types of the same priority, the CSI report corresponding to CSI subframe set $C_{CSI,1}$ is dropped.

In example embodiments, when a serving cell eNB 104 and UE 102 are configured in transmission mode 10, and the UE 102 is configured with the higher layer parameter tddModeAConfig-r12 for the serving cell, and the UE 102 is configured with CSI subframe sets $C_{CSI,0}$ and $C_{CSI,1}$ for the serving cell, then for a collision between CSI reports having the serving cell and with PUCCH reporting type of the same priority, and CSI processes with same csi-ProcessId-r11, the CSI report corresponding to CSI subframe set $C_{CSI,1}$ is dropped.

Figure 5:
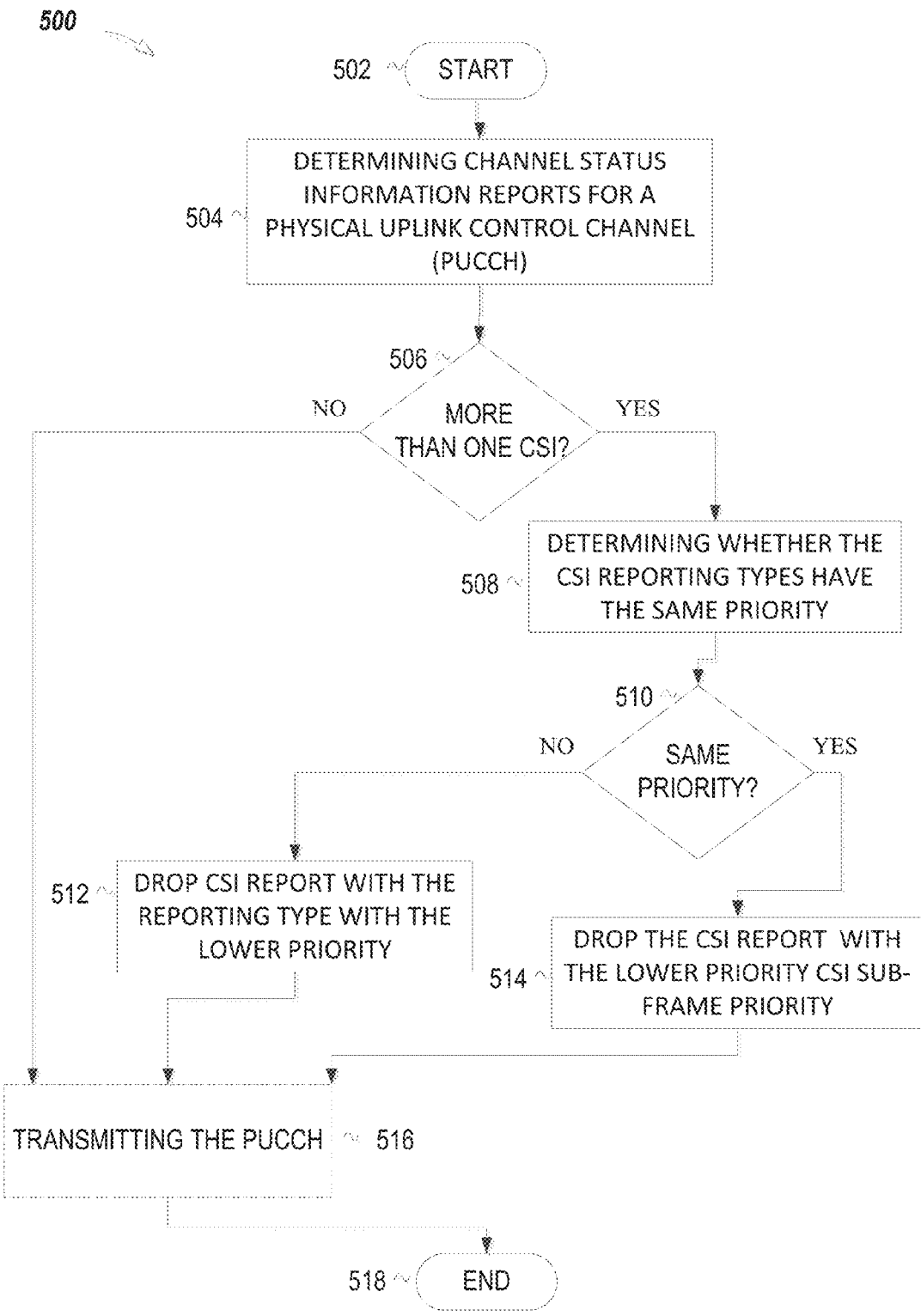
FIG. 5 illustrates a method to determine which channel status information (CSI) report of a user equipment (UE) to drop from a PUCCH packet, according to example embodiments.

FIG. 5 illustrates a method 500 to determine which channel status information (CSI) report (e.g., CSI report 182 of FIG. 1) of a user equipment (UE) (e.g., UE 102) to drop from a physical uplink control channel (PUCCH) packet, according to example embodiments.

The method 500 may begin at operation 502. The method 500 continues at operation 504 with determining CSI reports for a PUCCH. For example, the UE 102 (FIG. 1) may determine which CSI reports 182 are to be generated for one or more of carrier aggregation, CoMP, and eIMTA. In example embodiments, the UE determines that there are only CSI reports for eIMTA. In example embodiments, the UE 102 generates the CSI reports.

The method 500 continues at operation 506 with determining whether or not there is more than one CSI report. In example embodiments, the CSI report is included in the PUCCH format 2 on the primary cell that only has room for one CSI report. If there is not more than one CSI report, then the method 500 continues at operation 516 with transmitting the PUCCH with the CSI report. In example embodiments, the UE may generate the PUCCH and transmit the PUCCH to the eNodeB.

If there is more than one CSI report, then the method 500 continues at operation 508 with determining whether the CSI reporting types have the same priority. In example embodiments, the UE determines whether or not the reporting types are the same. The reporting types may be as disclosed in FIG. 2. If the reporting types are not the same, then the method 500 continues at operation 512 with dropping the CSI report with the reporting type with the lower priority.

For the reporting types disclosed in FIG. 2, the priorities may be a top priority with reporting types 3, 5, 6, and 2a; a second priority with 2, 2b, 2c, and 4; and a third priority with 1 and 1a. The UE may drop the CSI report with the lower priority. For example, if a first CSI report had a reporting type of 5 and a second CSI report had a reporting type of 2, then the second CSI report would be dropped because the first CSI report has a priority of a top priority and the second CSI report has a priority of a second priority. The method 500 continues with transmitting the PUCCH at operation 516.

If it is determined at operation 510 that the reporting types have the same priority, then the method 500 may continue at operation 514 with dropping the CSI report with the lower priority CSI sub-frame set. For sub-frames sets 0 and 1, the priority of the 0 sub-frame set may be higher than the priority of the 1 sub-frame set. For example, if a first CSI report has a sub-frame of 0 and a second CSI report has a sub-frame of 1, then the UE may drop the second CSI report with the sub-frame set of 1. In example embodiments, the UE may determine whether or not the UE higher layer is configured with tddModeAConfig-r12 to determine if eIMTA is being used. In example embodiments, the UE may be configured in transmission mode 1-9.

The method 500 may continue at operation 516 with transmitting the PUCCH. The method 500 then ends at operation 518. In example embodiments, there may be more than two CSI reports, in which case the method 500 is readily extendable.

Figure 6:
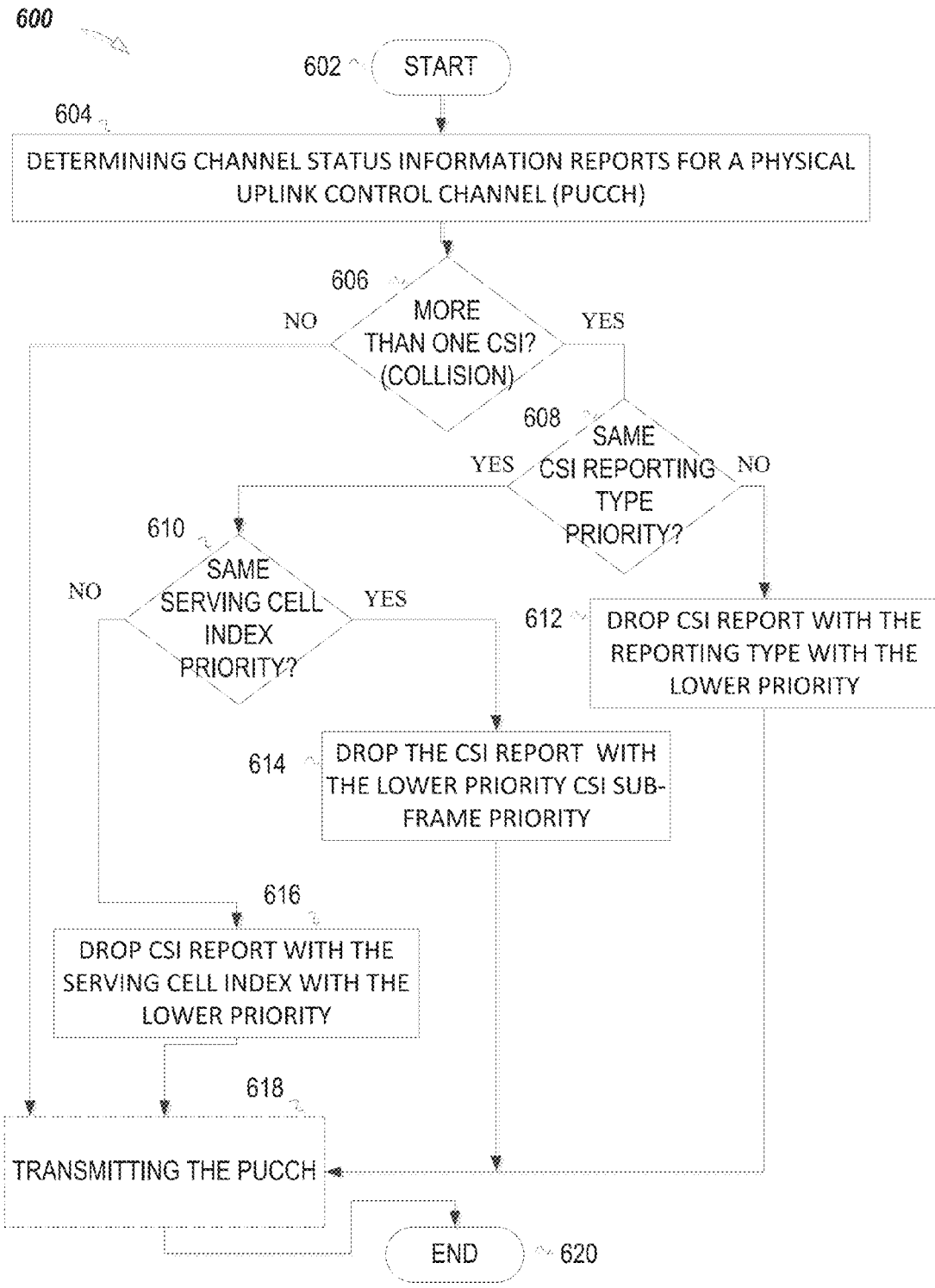
FIG. 6 illustrates a method to determine which CSI report of a UE to drop from a PUCCH packet, according to example embodiments.

FIG. 6 illustrates a method 600 to determine which channel status information (CSI) report (e.g., CSI report 182) of a user equipment (UE) (e.g., UE 102) to drop from a physical uplink control channel (PUCCH) packet, according to example embodiments.

The method 600 may begin at operation 602. The method 600 continues at operation 604 with determining CSI reports for a PUCCH. For example, the UE 102 (FIG. 1) may determine which CSI reports 182 are to be generated for one or more of carrier aggregation, CoMP, and eIMTA. In example embodiments, the UE 102 generates the CSI reports 182.

The method 600 continues at operation 606 with determining whether or not there is more than one CSI report. In example embodiments, the CSI report may need to be transmitted on the PUCCH format 2 on the primary cell that only has room for one CSI report. If there is not more than one CSI report, then the method 600 continues at operation 618 with transmitting the PUCCH with the CSI report. In example embodiments, the UE may generate the PUCCH and transmit the PUCCH to the eNodeB.

If it is determined at operation 606 that there is more than one CSI report, then the method 600 continues at operation 608 with determining whether the CSI reporting types have the same priority. In example embodiments, the UE determines whether or not the reporting types are the same. The reporting types may be as disclosed in FIG. 2. If the reporting types are not the same, then the method 600 continues at operation 612 with dropping the CSI report with the reporting type with the lower priority.

For the reporting types disclosed in FIG. 2, the priorities may be a top priority with reporting types 3, 5, 6, and 2a; a second priority with 2, 2b, 2c, and 4; and a third priority with 1 and 1a. The UE may drop the CSI report with the lower priority. For example, if a first CSI report had a reporting type of 5 and a second CSI report had a reporting type of 2, then the second CSI report would be dropped because the first CSI report has a priority of a top priority and the second CSI report has a priority of a second priority. The method 600 continues at operation 618 with transmitting the PUCCH.

If it is determined at operation 608 that the reporting types have the same priority, then the method 600 may continue at operation 610 with determining whether or not the CSI reports have a same serving cell index priority. For example, the serving cell priority may decrease as the corresponding serving cell index increases.

If the CSI reports do not have the same serving cell priority, then the method 600 continues at operation 616 with dropping the CSI report with the lower serving cell priority. For example, a first CSI report may have a serving cell index of 2 and a second CSI report may have a serving cell index of 3. The UE may drop the second CSI report because the priority of the first CSI report is higher than the second CSI report. The method 600 may continue at operation 618 with transmitting the PUCCH.

If the CSI reports do have the same serving cell priority, then the method 600 may continue at operation 614 with dropping the CSI report with the lower priority CSI sub-frame set priority. For sub-frames sets 0 and 1, the priority of the 0 sub-frame set may be higher than the priority of the 1 sub-frame set. For example, if a first CSI report has a sub-frame of 0 and a second CSI report has a sub-frame of 1, then the UE may drop the second CSI report with the sub-frame set of 1. In example embodiments, the UE may determine whether or not the UE higher layer is configured with tddModeAConfig-r12 to determine if eIMTA is being used. In example embodiments, the UE may be configured in transmission mode 1-9.

The method 600 may continue at operation 618 with transmitting the PUCCH. The method 600 then ends at operation 620. In example embodiments, there may be more than two CSI reports, in which case the method 600 is readily extendable.

Figure 7:
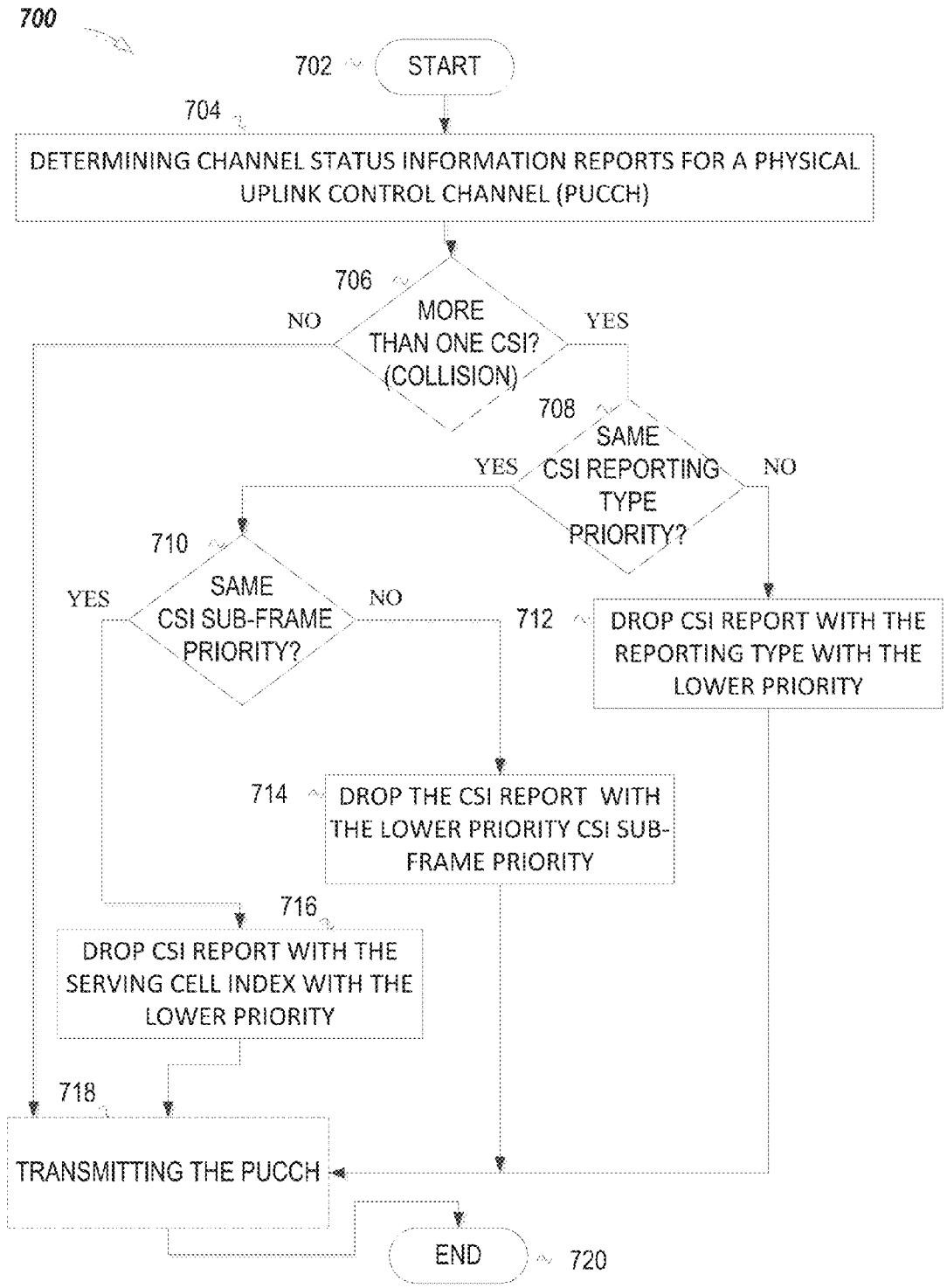
FIG. 7 illustrates a method to determine which CSI report of a UE to drop from a PUCCH packet, according to example embodiments.

FIG. 7 illustrates a method 700 to determine which channel status information (CSI) report (e.g., CSI report 182) of a user equipment (UE) (e.g., UE 102) to drop from a physical uplink control channel (PUCCH) packet, according to example embodiments.

The method 700 may begin at operation 702. The method 700 continues at operation 704 with determining CSI reports for a PUCCH. For example, the UE 102 (FIG. 1) may determine which CSI reports 182 are to be generated for one or more of carrier aggregation, CoMP, and eIMTA. In example embodiments, the UE 102 generates the CSI reports 182.

The method 700 continues at operation 706 with determining whether or not there is more than one CSI report. In example embodiments, the CSI report may need to be transmitted on the PUCCH format 2 on the primary cell that only has room for one CSI report. If there is not more than one CSI report, then the method 700 continues at operation 718 with transmitting the PUCCH with the CSI report. In example embodiments, the UE may generate the PUCCH and transmit the PUCCH to the eNodeB.

If there is more than one CSI report, then the method 700 continues at operation 708 with determining whether the CSI reporting types have the same priority. In example embodiments, the UE determines whether or not the reporting types are the same. The reporting types may be as disclosed in FIG. 2. If the reporting types are not the same, then the method 700 continues at operation 712 with dropping the CSI report with the reporting type with the lower priority.

For the reporting types disclosed in FIG. 2, the priorities may be a top priority with reporting types 3, 5, 6, and 2a; a second priority with 2, 2b, 2c, and 4; and, a third priority with 1 and 1a. The UE may drop the CSI report with the lower priority. For example, if a first CSI report had a reporting type of 5 and a second CSI report had a reporting type of 2, then the second CSI report would be dropped because the first CSI report has a priority of a top priority and the second CSI report has a priority of a second priority. The method 700 continues at operation 718 with transmitting the PUCCH.

If it is determined at operation 708 that the reporting types have the same priority, then the method 700 may continue at operation 710 with determining whether or not the CSI reports have a same CSI sub-frame set priority. For sub-frames sets 0 and 1, the priority of the 0 sub-frame set may be higher than the priority of the 1 sub-frame set. For example, if a first CSI report has a sub-frame of 0 and a second CSI report has a sub-frame of 1, then the UE may drop the second CSI report with the sub-frame set of 1. In example embodiments, the UE may determine whether or not the UE higher layer is configured with tddModeAConfig-r12 to determine if eIMTA is being used. In example embodiments, the UE may be configured in transmission mode 1-9.

If the CSI reports do not have the same CSI sub-frame set priorities, then the method 700 continues at operation 714 with dropping the CSI report with the lower CSI sub-frame set priority. For example, continuing with the example above, the UE may drop the CSI report with the sub-frame set of 1. The method 700 may continue at operation 718 with transmitting the PUCCH.

If the CSI sub-frame sets have the same priority, then the method 700 may continue at operation 716 with dropping the CSI report with the serving cell index with the lower priority. For example, the serving cell priority may decrease as the corresponding serving cell index increases. For example, a first CSI report may have a serving cell index of 2 and a second CSI report may have a serving cell index of 3. The UE may drop the first CSI report. The method 700 may continue at operation 718 with transmitting the PUCCH.

The method 700 then ends at operation 720. In example embodiments, there may be more than two CSI reports, in which case the method 700 is readily extendable.

Figure 8:
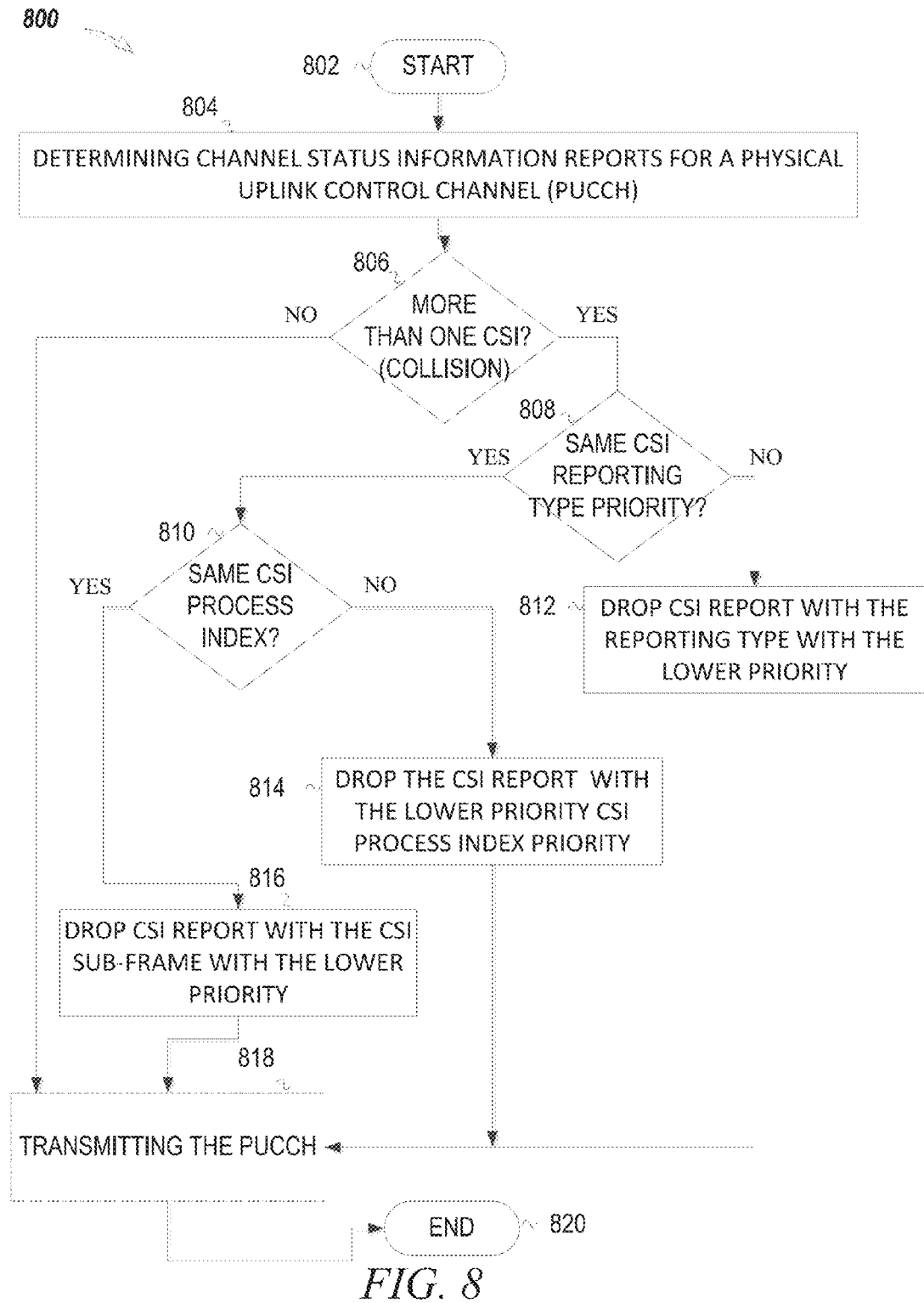
FIG. 8 illustrates a method to determine which CSI report of a UE to drop from a PUCCH packet, according to example embodiments.

FIG. 8 illustrates a method 800 to determine which channel status information (CSI) report (e.g., CSI report 182) of a user equipment (UE) (e.g., UE 102) to drop from a physical uplink control channel (PUCCH) packet, according to example embodiments.

The method 800 may begin at operation 802 with start. The method 800 continues at operation 804 with determining CSI reports for a PUCCH. For example, the UE 102 (FIG. 1) may determine which CSI reports 182 are to be generated for one or more of carrier aggregation, CoMP, and eIMTA. In example embodiments, the UE 102 generates the CSI reports 182.

The method 800 continues at operation 806 with determining whether or not there is more than one CSI report. In example embodiments, the CSI report may need to be transmitted on the PUCCH format 2 on the primary cell that only has room for one CSI report. If there is not more than one CSI report, then the method 800 continues at operation 818 with transmitting the PUCCH with the CSI report. In example embodiments, the UE may generate the PUCCH and transmit the PUCCH to the eNodeB.

If there is more than one CSI report, then the method 800 continues at operation 808 with determining whether the CSI reporting types have the same priority. In example embodiments, the UE determines whether or not the reporting types are the same. The reporting types may be as disclosed in FIG. 2. If the reporting types are not the same, then the method 800 continues at operation 812 with dropping the CSI report with the reporting type with the lower priority.

For the reporting types disclosed in FIG. 2, the priorities may be a top priority with reporting types 3, 5, 6, and 2a; a second priority with 2, 2b, 2c, and 4; and, a third priority with 1 and 1a. The UE may drop the CSI report with the lower priority. For example, if a first CSI report had a reporting type of 5 and a second CSI report had a reporting type of 2, then the second CSI report would be dropped because the first CSI report has a priority of a top priority and the second CSI report has a priority of a second priority. The method 800 continues at operation 818 with transmitting the PUCCH.

If it is determined at operation 808 that the reporting types have the same priority, then the method 800 may continue at operation 810 with determining whether or not the CSI reports have a same CSI process index priority. For example, the priority of a CSI process decreases as the corresponding CSI process index increases. In example embodiments, the CSI process index may be termed csi-ProcessID-r11.

If the CSI reports do not have the same CSI process index priority, then the method 800 continues at operation 814 with dropping the CSI report with the lower CSI process index priority. For example, a first CSI report may have a CSI process index of 2 and a second CSI report may have a CSI process index of 3. The UE may drop the second CSI report because the second CSI report has a lower CSI process index priority. The method 800 may continue at operation 818 with transmitting the PUCCH.

If the CSI reports do have the same CSI process index priority, then the method 800 may continue at operation 816 with dropping the CSI report with the lower priority CSI sub-frame set priority. For sub-frames sets 0 and 1, the priority of the 0 sub-frame set may be higher than the priority of the 1 sub-frame set. For example, if a first CSI report has a sub-frame of 0 and a second CSI report has a sub-frame of 1, then the UE may drop the second CSI report with the sub-frame set of 1. In example embodiments, the UE may determine whether or not the UE higher layer is configured with tddModeAConfig-r12 to determine if eIMTA is being used. In example embodiments, the UE may be configured in transmission mode 1-10.

The method 800 may continue at operation 818 with transmitting the PUCCH. The method 800 then ends at operation 820. In example embodiments, there may be more than two CSI reports, in which case the method is readily extendable.

Figure 9:
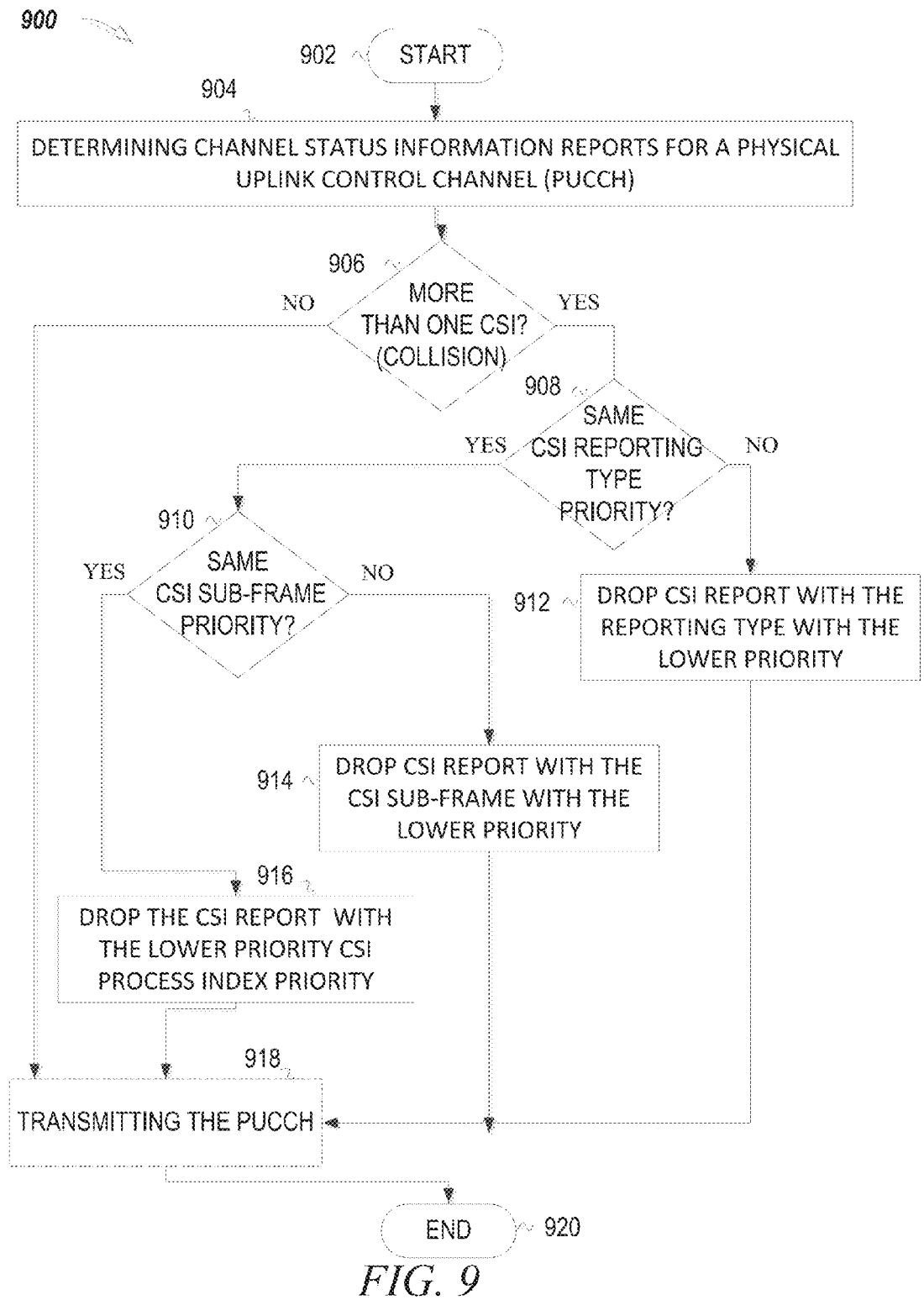
FIG. 9 illustrates a method to determine which CSI report of a UE to drop from a PUCCH packet, according to example embodiments.

FIG. 9 illustrates a method 900 to determine which channel status information (CSI) report (e.g., CSI report 182) of a user equipment (UE) (e.g., UE 102) to drop from a physical uplink control channel (PUCCH) packet, according to example embodiments.

The method 900 may begin at operation 902. The method 900 continues at operation 904 with determining CSI reports for a PUCCH. For example, the UE 102 (FIG. 1) may determine which CSI reports 182 are to be generated for one or more of carrier aggregation, CoMP, and eIMTA. In example embodiments, the UE 102 generates the CSI reports 182.

The method 900 continues at operation 906 with determining whether or not there is more than one CSI report. In example embodiments, the CSI report may need to be transmitted on the PUCCH format 2 on the primary cell that only has room for one CSI report. If there is not more than one CSI report, then the method 900 continues at operation 918 with transmitting the PUCCH with the CSI report. In example embodiments, the UE may generate the PUCCH and transmit the PUCCH to the eNodeB.

If there is more than one CSI report, then the method 900 continues at operation 908 with determining whether the CSI reporting types have the same priority. In example embodiments, the UE determines whether or not the reporting types are the same. The reporting types may be as disclosed in FIG. 2. If the reporting types are not the same, then the method 900 continues at operation 912 with dropping the CSI report with the reporting type with the lower priority.

For the reporting types disclosed in FIG. 2, the priorities may be a top priority with reporting types 3, 5, 6, and 2a; a second priority with 2, 2b, 2c, and 4; and, a third priority with 1 and 1a. The UE may drop the CSI report with the lower priority. For example, if a first CSI report had a reporting type of 5 and a second CSI report had a reporting type of 2, then the second CSI report would be dropped because the first CSI report has a priority of a top priority and the second CSI report has a priority of a second priority. The method 900 continues at operation 918 with transmitting the PUCCH.

If it is determined at operation 908 that the reporting types have the same priority, then the method 900 may continue at operation 910 with determining whether or not the CSI reports have a same CSI sub-frame set priority. For sub-frames sets 0 and 1, the priority of the 0 sub-frame set may be higher than the priority of the 1 sub-frame set. For example, if a first CSI report has a sub-frame of 0 and a second CSI report has a sub-frame of 1, then the UE may drop the second CSI report with the sub-frame set of 1. In example embodiments, the UE may determine whether or not the UE higher layer is configured with tddModeAConfig-r12 to determine if eIMTA is being used. In example embodiments, the UE may be configured in transmission mode 1-10.

If the CSI reports do not have the same CSI sub-frame set priorities, then the method 900 continues at operation 914 with dropping the CSI report with the lower CSI sub-frame set priority. For example, continuing with the example above, the UE may drop the CSI report with the sub-frame set of 1. The method 900 may continue at 918 with transmitting the PUCCH.

If the CSI sub-frame sets have the same priority, then the method 900 may continue at operation 916 with dropping the CSI report with the CSI process index with the lower priority. For example, a first CSI report may have a CSI process index of 2 and a second CSI report may have a CSI process index of 3. The UE may drop the second CSI report because the second CSI report has a lower CSI process index priority. The method 900 may continue at operation 918 with transmitting the PUCCH.

The method 900 then ends at operation 920. In example embodiments, there may be more than two CSI reports in which case the method is readily extendable.

Figure 10:
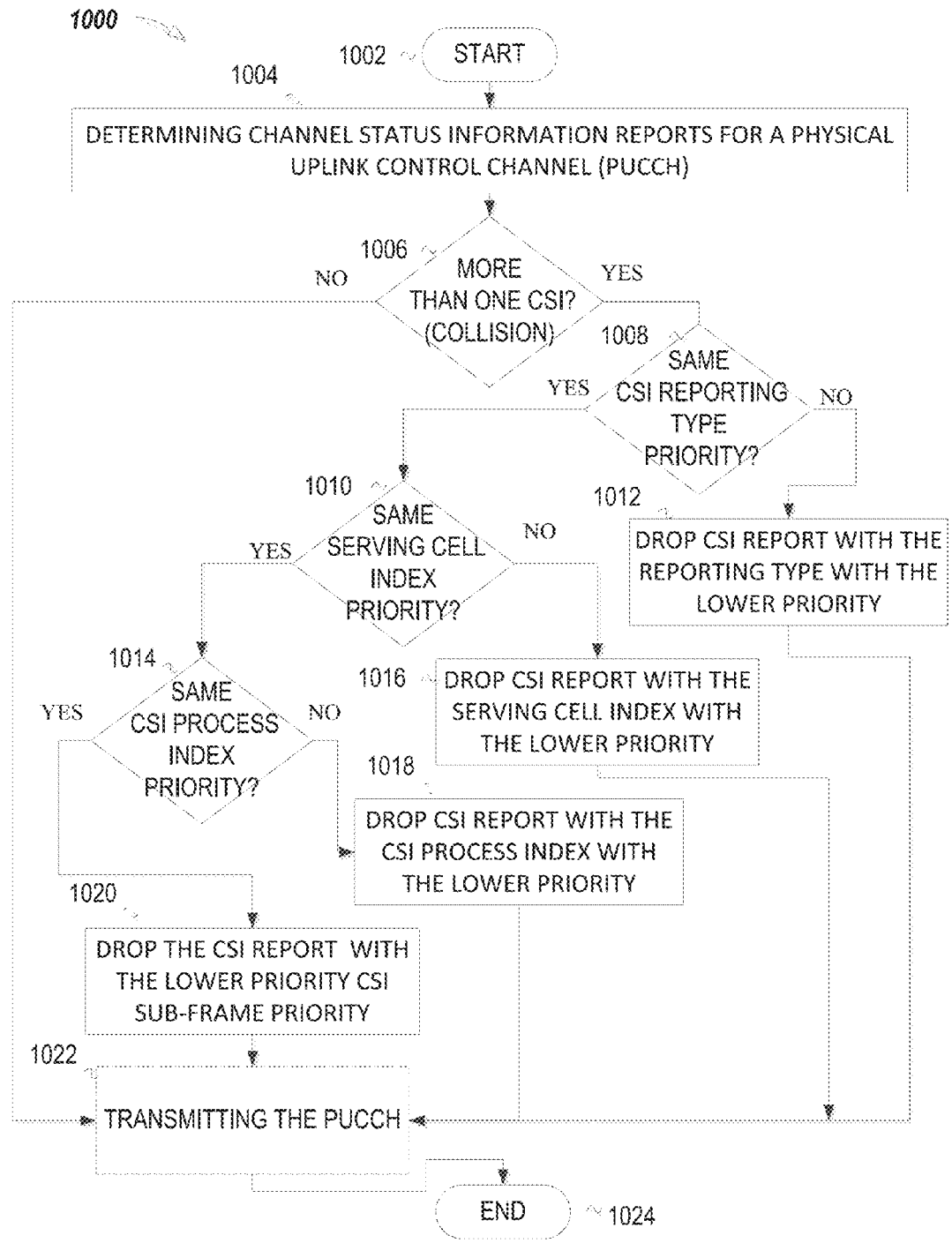
FIG. 10 illustrates a method to determine which CSI report of a UE to drop from a PUCCH packet, according to example embodiments.

FIG. 10 illustrates a method 1000 to determine which channel status information (CSI) report (e.g., CSI report 182) of a user equipment (UE) (e.g., UE 102) to drop from a physical uplink control channel (PUCCH) packet, according to example embodiments.

The method 1000 may begin at operation 1002 with start. The method 1000 continues at operation 1004 with determining CSI reports for a PUCCH. For example, the UE 102 (FIG. 1) may determine which CSI reports 182 are to be generated for one or more of carrier aggregation, CoMP, and eIMTA. In example embodiments, the UE 102 generates the CSI reports.

The method 1000 continues at operation 1006 with determining whether or not there is more than one CSI report. In example embodiments, the CSI report may need to be transmitted on the PUCCH format 2 on the primary cell that only has room for one CSI report. If there is not more than one CSI report, then the method 1000 continues at operation 1022 with transmitting the PUCCH with the CSI report. In example embodiments, the UE may generate the PUCCH and transmit the PUCCH to the eNodeB.

If there is more than one CSI report, then the method 1000 continues at operation 1008 with determining whether the CSI reporting types have the same priority. In example embodiments, the UE determines whether or not the reporting types are the same. The reporting types may be as disclosed in FIG. 2. If the reporting types are not the same, then the method 1000 continues at operation 1012 with dropping the CSI report with the reporting type with the lower priority.

For the reporting types disclosed in FIG. 2, the priorities may be a top priority with reporting types 3, 5, 6, and 2a; a second priority with 2, 2b, 2c, and 4; and, a third priority with 1 and 1a. The UE may drop the CSI report with the lower priority. For example, if a first CSI report had a reporting type of 5 and a second CSI report had a reporting type of 2, then the second CSI report would be dropped because the first CSI report has a priority of a top priority and the second CSI report has a priority of a second priority. The method 1000 continues at 1022 with transmitting the PUCCH.

If the reporting types have the same priority, then the method 1000 may continue at operation 1010 with determining whether or not the CSI reports have a same serving cell index priority. For example, the serving cell priority may decrease as the corresponding serving cell index increases.

If it is determined at operation 1010 that the CSI reports do not have the same serving cell priority, then the method 1000 continues at operation 1016 with dropping the CSI report with the lower serving cell priority. For example, a first CSI report may have a serving cell index of 2 and a second CSI report may have a serving cell index of 3. The UE may drop the second CSI report because the priority of the first CSI report is higher than the second CSI report. The method 1000 may continue at operation 1022 with transmitting the PUCCH.

If the reporting types have the same priority, then the method 1000 may continue at 1014 with determining whether or not the CSI reports have a same CSI process index priority. For example, the priority of a CSI process decreases as the corresponding CSI process index increases. In example embodiments, the CSI process index may be termed csi-ProcessID-r11.

If the CSI reports do not have the same CSI process index priority, then the method 1000 continues at operation 1018 with dropping the CSI report with the lower CSI process index priority. For example, a first CSI report may have a CSI process index of 2 and a second CSI report may have a CSI process index of 3. The UE may drop the second CSI report because the second CSI report has a lower CSI process index priority. The method 1000 may continue at operation 1022 with transmitting the PUCCH.

If the CSI reports do have the same CSI process index priority, then the method 1000 may continue at operation 1020 with dropping the CSI report with the lower priority CSI sub-frame set priority. For sub-frames sets 0 and 1, the priority of the 0 sub-frame set may be higher than the priority of the 1 sub-frame set. For example, if a first CSI report has a sub-frame of 0 and a second CSI report has a sub-frame of 1, then the UE may drop the second CSI report with the sub-frame set of 1. In example embodiments, the UE may determine whether or not the UE higher layer is configured with tddModeAConfig-r12 to determine if eIMTA is being used. In example embodiments, the UE may be configured in transmission mode 1-9.

The method 1000 may continue at operation 1022 with transmitting the PUCCH. The method 1000 then ends at operation 1024. In example embodiments, there may be more than two CSI reports, in which case the method 1000 is readily extendable.

Figure 11:
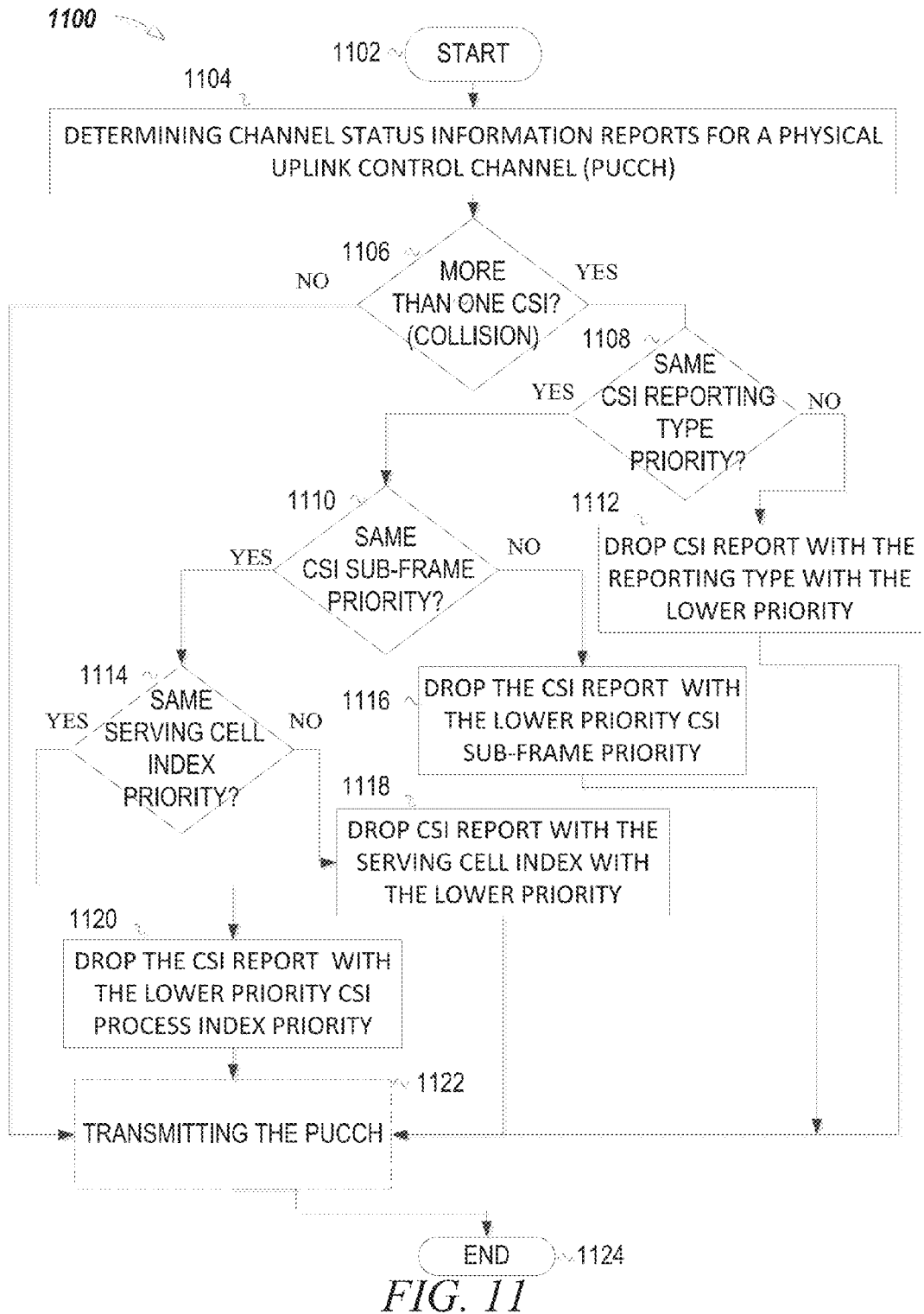
FIG. 11 illustrates a method to determine which CSI report of a UE to drop from a PUCCH packet, according to example embodiments.

FIG. 11 illustrates a method 1100 to determine which channel status information (CSI) report of a user equipment (UE) to drop from a physical uplink control channel (PUCCH) packet, according to example embodiments.

The method 1100 may begin at operation 1102. The method 1100 continues at operation 1104 with determining CSI reports for a PUCCH. For example, the UE 102 (FIG. 1) may determine which CSI reports 182 are to be generated for one or more of carrier aggregation, CoMP, and eIMTA. In example embodiments, the UE 102 generates the CSI reports 182.

The method 1100 continues at operation 1106 with determining whether or not there is more than one CSI report. In example embodiments, the CSI report may need to be transmitted on the PUCCH format 2 on the primary cell that only has room for one CSI report. If there is not more than one CSI report, then the method 1100 continues at operation 1122 with transmitting the PUCCH with the CSI report. In example embodiments, the UE may generate the PUCCH and transmit the PUCCH to the eNodeB.

If there is more than one CSI report, then the method 1100 continues at operation 1108 with determining whether the CSI reporting types have the same priority. In example embodiments, the UE determines whether or not the reporting types are the same. The reporting types may be as disclosed in FIG. 2. If the reporting types are not the same, then the method 1100 continues at operation 1112 with dropping the CSI report with the reporting type with the lower priority.

For the reporting types disclosed in FIG. 2, the priorities may be a top priority with reporting types 3, 5, 6, and 2a; a second priority with 2, 2b, 2c, and 4; and, a third priority with 1 and 1a. The UE may drop the CSI report with the lower priority. For example, if a first CSI report had a reporting type of 5 and a second CSI report had a reporting type of 2, then the second CSI report would be dropped because the first CSI report has a priority of a top priority and the second CSI report has a priority of a second priority. The method 1100 continues at 1122 with transmitting the PUCCH.

If the reporting types have the same priority, then the method 1100 may continue at operation 1110 with determining whether or not the CSI reports have a same CSI sub-frame set priority. For sub-frames sets 0 and 1, the priority of the 0 sub-frame set may be higher than the priority of the 1 sub-frame set. For example, if a first CSI report has a sub-frame of 0 and a second CSI report has a sub-frame of 1, then the UE may drop the second CSI report with the sub-frame set of 1. In example embodiments, the UE may determine whether or not the UE higher layer is configured with tddModeAConfig-r12 to determine if eIMTA is being used. In example embodiments, the UE may be configured in transmission mode 1-10.

If CSI reports do not have the same CSI sub-frame set priorities, then the method 1100 continues at operation 1116 with dropping the CSI report with the lower CSI sub-frame set priority. For example, continuing with the example above, the UE may drop the CSI report with the sub-frame set of 1. The method 1100 may continue at operation 1122 with transmitting the PUCCH.

If the CSI sub-frame sets have the same priority, then the method 1100 may continue at operation 1114 with determining whether or not the CSI reports have a same serving cell index priority. For example, the serving cell priority may decrease as the corresponding serving cell index increases.

If the CSI reports do not have the same serving cell priority, then the method 1100 continues at operation 1118 with dropping the CSI report with the lower serving cell priority. For example, a first CSI report may have a serving cell index of 2 and a second CSI report may have a serving cell index of 3. The UE may drop the second CSI report because the priority of the first CSI report is higher than the second CSI report. The method 1100 may continue at operation 1122 with transmitting the PUCCH.

If the CSI reports do have the same serving cell priority, then the method 1100 continues at operation 1120 with dropping the CSI report with the CSI process index with the lower priority. For example, a first CSI report may have a CSI process index of 2 and a second CSI report may have a CSI process index of 3. The UE may drop the second CSI report because the second CSI report has a lower CSI process index priority. The method 1100 may continue at operation 1122 with transmitting the PUCCH.

The method 1100 then ends at 1124. In example embodiments, there may be more than two CSI reports, in which case the method 1100 is readily extendable.

Figure 12:
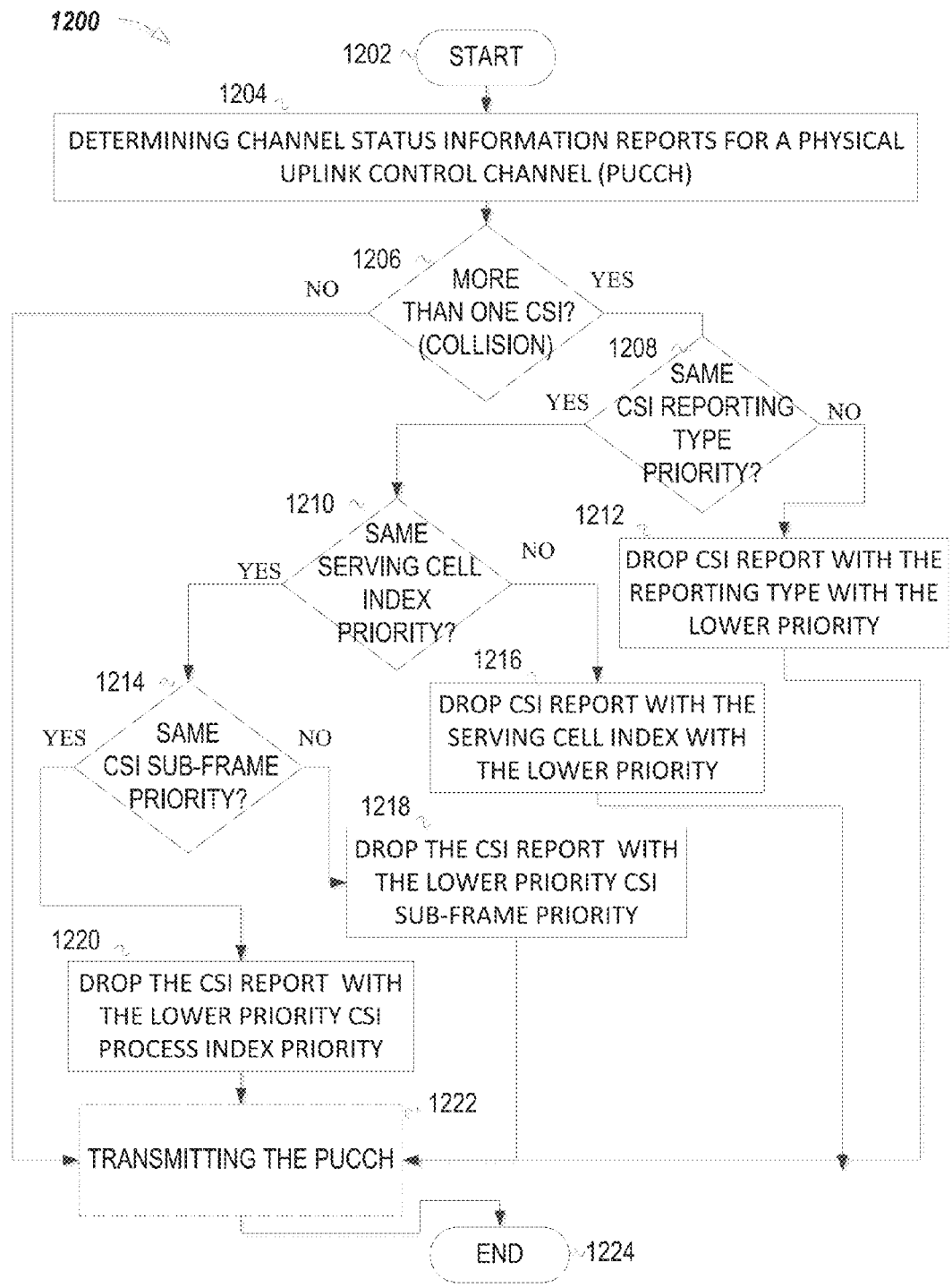
FIG. 12 illustrates a method to determine which CSI report of a UE to drop from a PUCCH packet, according to example embodiments.

FIG. 12 illustrates a method 1200 to determine which channel status information (CSI) report of a user equipment (UE) to drop from a physical uplink control channel (PUCCH) packet, according to example embodiments.

The method 1200 may begin at operation 1202. The method 1200 continues at operation 1204 with determining CSI reports (e.g., CSI reports 182) for a PUCCH. For example, the UE 102 (FIG. 1) may determine which CSI reports are to be generated for one or more of carrier aggregation, CoMP, and eIMTA. In example embodiments, the UE 102 generates the CSI reports 182.

The method 1200 continues at operation 1206 with determining whether or not there is more than one CSI report. In example embodiments, the CSI report may need to be transmitted on the PUCCH format 2 on the primary cell that only has room for one CSI report. If there is not more than one CSI report, then the method 1200 continues at operation 1222 with transmitting the PUCCH with the CSI report. In example embodiments, the UE may generate the PUCCH and transmit the PUCCH to the eNodeB.

If there is more than one CSI report, then the method 1200 continues at operation 1208 with determining whether the CSI reporting types have the same priority. In example embodiments, the UE determines whether or not the reporting types are the same. The reporting types may be as disclosed in FIG. 2. If the reporting types are not the same, then the method 1200 continues at operation 1212 with dropping the CSI report with the reporting type with the lower priority.

For the reporting types disclosed in FIG. 2, the priorities may be a top priority with reporting types 3, 5, 6, and 2a; a second priority with 2, 2b, 2c, and 4; and, a third priority with 1 and 1a. The UE may drop the CSI report with the lower priority. For example, if a first CSI report had a reporting type of 5 and a second CSI report had a reporting type of 2, then the second CSI report would be dropped because the first CSI report has a priority of a top priority and the second CSI report has a priority of a second priority. The method 1200 continues at operation 1222 with transmitting the PUCCH.

If the reporting types have the same priority, then the method 1200 may continue at operation 1210 with determining whether or not the CSI reports have a same serving cell index priority. For example, the serving cell priority may decrease as the corresponding serving cell index increases.

If the CSI reports do not have the same serving cell priority, then the method 1200 continues at operation 1216 with dropping the CSI report with the lower serving cell priority. For example, a first CSI report may have a serving cell index of 2 and a second CSI report may have a serving cell index of 3. The UE may drop the second CSI report because the priority of the first CSI report is higher than the second CSI report. The method 1200 may continue at operation 1222 with transmitting the PUCCH.

If the CSI reports do have the same serving cell priority, then the method 1200 may continue at operation 1214 with determining whether or not the CSI reports have a same CSI sub-frame set priority. For sub-frames sets 0 and 1, the priority of the 0 sub-frame set may be higher than the priority of the 1 sub-frame set. For example, if a first CSI report has a sub-frame of 0 and a second CSI report has a sub-frame of 1, then the UE may drop the second CSI report with the sub-frame set of 1. In example embodiments, the UE may determine whether or not the UE higher layer is configured with tddModeAConfig-r12 to determine if eIMTA is being used. In example embodiments, the UE may be configured in transmission mode 1-10.

If CSI reports do not have the same CSI sub-frame set priorities, then the method 1200 continues at operation 1218 with dropping the CSI report with the lower CSI sub-frame set priority. For example, continuing with the example above, the UE may drop the CSI report with the sub-frame set of 1. The method 1200 may continue at operation 1222 with transmitting the PUCCH.

If the CSI sub-frame sets have the same priority, then the method 1200 may continue at operation 1220 with dropping the CSI report with the CSI process index with the lower priority. For example, a first CSI report may have a CSI process index of 2 and a second CSI report may have a CSI process index of 3. The UE may drop the second CSI report because the second CSI report has a lower CSI process index priority. The method 1200 may continue at 1222 with transmitting the PUCCH.

The method 1200 then ends at 1224. In example embodiments, there may be more than two CSI reports, in which case the method 1200 is readily extendable.

Figure 13:
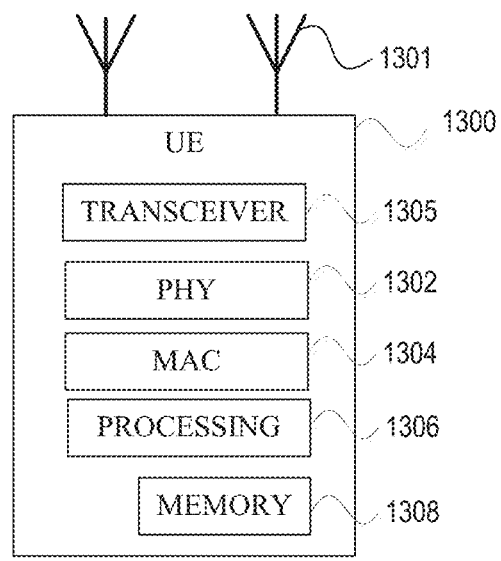
FIG. 13 shows a block diagram of a UE in accordance with some embodiments.
Figure 14:
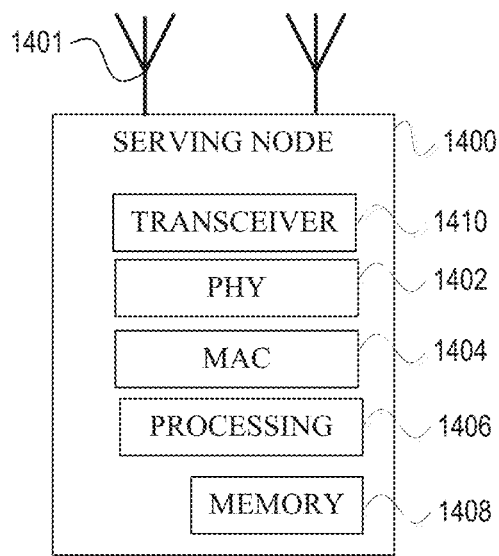
FIG. 14 shows a block diagram of an eNB in accordance with some embodiments.

FIG. 13 shows a block diagram of a UE 1300 in accordance with some embodiments, while FIG. 14 shows a block diagram of an eNB 1400 in accordance with some embodiments. It should be noted that in some embodiments, the eNB 1400 may be a stationary non-mobile device. The UE 1300 may be a UE 102 as depicted in FIG. 1, while the eNB 1400 may be an eNB 104 as depicted in FIG. 1. The UE 1300 may include physical layer circuitry (PHY) 1302 for transmitting and receiving signals to and from the eNB 1400, other eNBs, other UEs or other devices using one or more antennas 1301, while the eNB 1400 may include physical layer circuitry 1402 for transmitting and receiving signals to and from the UE 1300, other eNBs, other UEs or other devices using one or more antennas 1401. The UE 1300 may also include medium access control layer (MAC)

circuitry 1304 for controlling access to the wireless medium, while the eNB 1400 may also include medium access control layer (MAC) circuitry 1404 for controlling access to the wireless medium. The UE 1300 may also include processing circuitry 1306 and memory 1308 arranged to perform the operations described herein, and the eNB 1400 may also include processing circuitry 1406 and memory 1408 arranged to perform the operations described herein. The UE 1300 may include a transceiver 1305 for controlling the antenna 1301, while the eNB 1400 may include a transceiver 1410 for controlling the antenna 1401.

The antennas 1301, 1401 may comprise one or more directional or omnidirectional antennas, including, for example, dipole antennas, monopole antennas, patch antennas, loop antennas, microstrip antennas or other types of antennas suitable for transmission of RF signals. In some multiple-input multiple-output (MIMO) embodiments, the antennas 1301, 1401 may be effectively separated to take advantage of spatial diversity and the different channel characteristics that may result.

Although the UE 1300 and eNB 1400 are each illustrated as having several separate functional elements, one or more of the functional elements may be combined and may be implemented by combinations of software-configured elements, such as processing elements including digital signal processors (DSPs), and/or other hardware elements. For example, some elements may comprise one or more microprocessors, DSPs, field-programmable gate arrays (FPGAs), application specific integrated circuits (ASICs), radio-frequency integrated circuits (RFICs) and combinations of various hardware and logic circuitry for performing at least the functions described herein. In some embodiments, the functional elements may refer to one or more processes operating on one or more processing elements.

Embodiments may be implemented in one or a combination of hardware, firmware and software. Embodiments may also be implemented as instructions stored on a computer-readable storage device, which may be read and executed by at least one processor to perform the operations described herein. A computer-readable storage device may include any non-transitory mechanism for storing information in a form readable by a machine (e.g., a computer). For example, a computer-readable storage device may include read-only memory (ROM), random-access memory (RAM), magnetic disk storage media, optical storage media, flash-memory devices, and other storage devices and media. Some embodiments may include one or more processors and may be configured with instructions stored on a computer-readable storage device.

In accordance with embodiments, the UE 1300 and eNodeB 1400 may be configured for one or more of the example embodiments described herein for dropping CSI reports based on one or more of the priority of the reporting type, the priority of the CSI sub-frame set, the priority of the serving cell index, and the priority of the CSI process index.

The following examples pertain to further embodiments. Example 1 is a wireless communication device. The wireless communication device includes hardware processing circuitry configured to: determine that at least a first channel status information (CSI) report and a second CSI report are to be sent in a physical uplink control channel (PUCCH), wherein the first CSI report has a first reporting type and a first CSI sub-frame set, and the second CSI report has a second reporting type and a second CSI sub-frame set. The hardware processing circuitry may be further configured to: if the first reporting type and the second reporting type have a first same priority, then determine to drop the first CSI report if the first CSI sub-frame set has a second lower priority than the second CSI sub-frame set.

In Example 2, the subject matter of Example 1 can optionally include: wherein the hardware processing circuitry is further configured to: drop the first CSI report if it was determined to drop the first CSI report.

In Example 3, the subject matter of Examples 1 and 2 can optionally include: wherein the wireless communication device is in a transmission mode of 1-9 and wherein the wireless communication device is configured with tddModeAConfig-r12.

In Example 4, the subject matter of Examples 1 through 3 can optionally include: wherein the first CSI report has a first CSI process index and the second CSI report has a second CSI process index, and the hardware processing circuitry may be further configured to: if the first reporting type and the second reporting type have the first same priority, and if the first CSI process index and the second CSI process index have a fourth same reporting priority, then drop the first CSI report if the first CSI sub-frame set has a second lower priority than the second CSI sub-frame set.

In Example 5, the subject matter of Examples 1 through 4 can optionally include: wherein the wireless communication device is in a transmission mode 10 and the wireless communication device is configured with a higher layer parameter tddModeAConfig-r12, and the wireless communication device is configured with csi-ProcessID-r11 or CSI process index, and wherein the first sub-frame is a 1 and the second sub-frame is a 0.

In Example 6, the subject matter of Examples 1 through 5 can optionally include: wherein the first CSI sub-frame set and the second CSI sub-frame set are each one of a group comprising: 0 and 1.

In Example 7, the subject matter of Examples 1 through 6 can optionally include: wherein the first CSI sub-frame set has a second lower priority if the first CSI sub-frame set is 1 and the second CSI sub-frame set is 0.

In Example 8, the subject matter of Examples 1 through 7 can optionally include: wherein the hardware processing circuitry is further configured to drop the first CSI report if the first reporting type has a first lower priority than the second reporting type.

In Example 9, the subject matter of Examples 1 through 8 can optionally include: wherein the first CSI report has a first serving cell index and the second CSI report has a second serving cell index, and wherein the hardware processing circuitry may be further configured to: if the first reporting type and the second reporting type have the first same priority, then drop the first CSI report if the first serving cell index has a third lower priority than the second serving cell index; otherwise if the first serving cell index and the second serving cell index have a second same priority, then drop the first CSI report if the first CSI sub-frame set has a second lower priority than the second CSI sub-frame set.

In Example 10, the subject matter of Examples 1 through 9 can optionally include: wherein the first CSI report has a first serving cell index and the second CSI report has a second serving cell index, and wherein the hardware processing circuitry may be further configured to: if the first reporting type and the second reporting type have the first same priority, then drop the first CSI report if the first CSI sub-frame set has a second lower priority than the second CSI sub-frame set; otherwise if the first CSI sub-frame set and the second CSI sub-frame set have a third same priority, then drop the first CSI report if the first serving cell index has a third lower priority than the second serving cell index.

In Example 11, the subject matter of Examples 1 through 10 can optionally include: wherein the first CSI report has a first CSI process index and the second CSI report has a second CSI process index, and wherein the hardware processing circuitry may be further configured to: if the first reporting type and the second reporting type have the first same priority, then drop the first CSI report if the first CSI process index has a forth lower priority than the second CSI process index; otherwise if the first CSI process index and the second CSI process index have a fourth same reporting priority, then drop the first CSI report if the first CSI sub-frame set has a second lower priority than the second CSI sub-frame set.

In Example 12, the subject matter of Examples 1 through 11 can optionally include: wherein the first CSI report has a first CSI process index and the second CSI report has a second CSI process index, and wherein the hardware processing circuitry may be further configured to: if the first reporting type and the second reporting type have the first same priority, then drop the first CSI report if the first CSI sub-frame set has a second lower priority than the second CSI sub-frame set; otherwise if the first CSI process index and the second CSI process index have a fourth same reporting priority, then drop the first CSI report if the first CSI process index has a fourth lower priority than the second CSI process index.

In Example 13, the subject matter of Examples 1 through 12 can optionally include: memory and a transceiver coupled to the hardware processing circuitry.

In Example 14, the subject matter of Example 13 can optionally include: one or more antennas coupled to the transceiver.

In Example 15, a wireless communication device is disclosed. The wireless communication device includes hardware processing circuitry configured to: determine that at least a first channel status information (CSI) report and a second CSI report are to be sent in a physical uplink control channel (PUCCH), the first CSI report having a first reporting type, first CSI process index, and a first CSI sub-frame set, and the second CSI report having a second reporting type, a second CSI process index, and a second CSI sub-frame set. The hardware processing circuitry may be further configured to determine to drop the first CSI report if the first reporting type has a first lower priority than the second reporting type; and if the first reporting type and the second reporting type have a first same priority, then drop the first CSI report if the first CSI process index has a forth lower priority than the second CSI process index; otherwise if the first CSI process index and the second CSI process index have a fourth same reporting priority, then drop the first CSI report if the first CSI sub-frame set has a second lower priority than the second CSI sub-frame set.

In Example 16, the subject matter of Example 15 can optionally include: wherein the hardware processing circuitry is further configured to: drop the first CSI report if it was determined to drop the first CSI report.

In Example 17, the subject matter of Examples 15 and 16 can optionally include: wherein the wireless communication device is in a transmission mode 10, the wireless communication device is configured with a higher layer parameter tddModeAConfig-r12, and the wireless communication device is configured with csi-ProcessID-r11, and wherein the first CSI sub-frame set is a 1 and the second CSI sub-frame set is a 0.

In Example 18 a method on a wireless communication device to drop a channel status information (CSI) report from a physical uplink control channel (PUCCH) packet is disclosed. The method may include determining that at least a first CSI report and a second CSI report are to be sent in the PUCCH, the first CSI report having a first reporting type and a first CSI sub-frame set, and the second CSI report having a second reporting type and a second CSI sub-frame set. The method may further include if the first reporting type and the second reporting type have a first same priority, then determine to drop the first CSI report if the first CSI sub-frame set has a second lower priority than the second CSI sub-frame set.

In Example 19, the subject matter of Example 18 can optionally include: dropping the first CSI report if it was determined to drop the first CSI report.

In Example 20, the subject matter of Example 19 can optionally include: dropping the first CSI report if the first reporting type has a first lower priority than the second reporting type.

In Example 21, the subject matter of Examples 19 and 20 can optionally include: wherein the wireless communication device is in a transmission mode of 1-9 and wherein the wireless communication device is configured with tddModeAConfig-r12.

In Example 22, the subject matter of Examples 19 through 21 can optionally include: wherein the first CSI report has a first CSI process index and the second CSI report has a second CSI process index, and wherein the method may further include: dropping the first CSI report if the first CSI sub-frame set has a second lower priority than the second CSI sub-frame set, if the first reporting type and the second reporting type have the first same priority, and if the first CSI process index and the second CSI process index have a fourth same reporting priority.

In Example 23, the subject matter of Examples 19 through 22 can optionally include: wherein the wireless communication device is in a transmission mode 10, the wireless communication device is configured with a higher layer parameter tddModeAConfig-r12, and the wireless communication device is configured with csi-ProcessID-r11, and wherein the first CSI sub-frame set is a 1 and the second CSI sub-frame set is a 0.

In Example 24, a non-transitory computer-readable storage medium that stores instructions for execution by one or more processors to determine which channel status information (CSI) report of a user equipment (UE) to drop from a physical uplink control channel (PUCCH) packet is disclosed. The instructions may include determine that at least a first CSI report and a second CSI report are to be sent in the PUCCH, the first CSI report having a first reporting type and a first CSI sub-frame set, and the second CSI report having a second reporting type and a second CSI sub-frame set. The instructions may further include if the first reporting type and the second reporting type have a first same priority, then drop the first CSI report if the first CSI sub-frame set has a second lower priority than the second CSI sub-frame set.

In Example 25, the subject matter of Example 24 can optionally include: wherein the operations further comprise: if the first reporting type and the second reporting type have the first same priority, and if a first CSI process index and a second CSI process index have a fourth same reporting priority, then drop the first CSI report if the first CSI sub-frame set has a second lower priority than the second CSI sub-frame set.

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate embodiment.

What is claimed is:

1. An apparatus of a wireless communication device comprising:
    memory; and
    a processing circuitry, the processing circuitry to:
        configure the wireless communication device to:
            send at least a first channel status information (CSI) report and a second CSI report in a physical uplink control channel (PUCCH), wherein the first CSI report has a first reporting type and a first CSI sub-frame set, and the second CSI report has a second reporting type and a second CSI sub-frame set; and
        drop the first CSI report if the second CSI sub-frame set has a higher priority than the first CSI sub-frame set if the first reporting type and the second reporting type have a same priority, wherein the first CSI report and the second CSI report are generated at least for one or more of carrier aggregation and Coordinated Multi-Point (CoMP) system.

2. The apparatus of claim 1, wherein the processing circuitry is further configured to configure a higher layer with tddModeAConfig-r12 and to configure a user equipment is a transmission mode of 1-9.

3. The apparatus of claim 1, wherein the first CSI report has a first CSI process index and the second CSI report has a second process index, and wherein the processing circuitry is further configured to:
    drop the first CSI report if the second CSI sub-frame set has a higher priority than the first CSI sub-frame set if the first reporting type and the second reporting type have a same priority, and if the first CSI process index and the second CSI process index have a same priority.

4. The apparatus of claim 3, wherein the UE is in a transmission mode 10 and the UE is configured with a higher layer parameter tddModeAConfig-r12, and the UE is configured with csi-ProcessID-r11 or CSI process index, and wherein the first sub-frame is a 1 and the second sub-frame is a 0.

5. The apparatus of claim 1, wherein the first CSI sub-frame set and the second CSI sub-frame set are each one of a group comprising:
    0 and 1.

6. The apparatus of claim 5, wherein the second CSI sub-frame set has a higher priority if the first CSI sub-frame set is 1 and the second CSI sub-frame set is 0.

7. The apparatus of claim 1, wherein the processing circuitry is further configured to drop the first CSI report if the first report type has a lower priority than the second reporting type.

8. The apparatus of claim 1, wherein first CSI port has a first serving cell index and the second CSI report has a second serving cell index, and wherein the processing circuitry is further configured to:
    if the first reporting type and the second reporting type have a same priority, then drop the first CSI report if the first serving cell index has a lower priority than the second serving cell index and the second serving cell index have a same priority, then drop the first CSI report if the second CSI sub-frame set has a higher priority than the first CSI sub-frame set.

9. The apparatus of claim 1, wherein first CSI report has a first serving cell index and the second CSI report has a second serving cell index, and wherein the processing circuitry is further configured to:
    if the first reporting type and the second reporting type have a same priority, then drop the first CSI report if the second CSI sub-frame set has a higher priority than the first CSI sub-frame set;
    otherwise if the first CSI sub-frame set and the second CSI sub-frame set have a same priority, then drop the first CSI report if the first serving cell index has a lower priority than the second serving cell index.

10. The apparatus of claim 1, wherein first CSI report has a first CSI process index and the second CSI report has a second CSI process index, and wherein the processing circuitry is further configured to:
    if the first reporting type and the second reporting type have a same priority, then drop the first CSI report if the first CSI process index has a lower priority than the second CSI process index;
    otherwise if the first CSI process index and the second CSI process index have a same reporting priority, then drop the first CSI report if the first CSI sub-frame set has a lower priority than the second CSI sub-frame set.

11. The apparatus of claim 1, wherein first CSI report has a first CSI process index and the second CSI report has a second CSI process index, and wherein the processing circuitry is further configured to:
    if the first reporting type and the second reporting type have a same priority, then drop the first CSI report if the second CSI sub-frame set has a higher priority than the first CSI sub-frame set;
    otherwise if the first CSI process index and the second CSI process index have a same reporting priority, then drop the first CSI report if the first CSI process index has a lower priority than the second CSI process index.

12. A User equipment (UE), comprising:
    memory; and
    a processing circuitry:
        the processing circuitry to include at least a medium access control (MAC) block and a physical layer block, the processing circuitry configured to:
            send a feedback including at least a first channel status information (CSI) report and a second CSI report in a physical uplink control channel (PUCCH), wherein the first CSI report has a first reporting type and a first CSI sub-frame set, and the second CSI report has a second reporting type and a second CSI sub-frame set; and
        drop the first CSI report if the second CSI sub-frame set has a higher priority than the first CSI sub-frame set if the first reporting type and the second reporting type have a same priority, wherein the first CSI report and the second CSI report are generated at least for one or more of carrier aggregation and Coordinated Multi-Point (COMP) system.

13. The UE of claim 12, wherein the processing circuitry is further configured to drop the first CSI if it was determined to drop the first CSI report.

14. The UE of claim 12, wherein the UE is in a transmission mode of 1-9 and wherein the UE is configured with tddModeAConfig-r12.

15. The UE of claim 12, wherein the first CSI report has a first CSI process index and the second CSI report has a second process index, and wherein the processing circuitry is further configured to:
    drop the first CSI report if the second CSI sub-frame set has a higher priority than the first CSI sub-frame set if the first reporting type and the second reporting type have a same priority, and if the first CSI process index and the second CSI process index have a same priority.

16. The UE of claim 12, wherein the first CSI sub-frame set and the second CSI sub-frame set are each one of a group comprising:
0 and 1.

17. The UE of claim 16, wherein the second CSI sub-frame set has a higher priority if the first CSI sub-frame set is 1 and the second CSI sub-frame set is 0.

18. The UE of claim 12, wherein the processing circuitry is further configured to drop the first CSI report if the first report type has a lower priority than the second reporting type.

19. The UE of claim 12, wherein first CSI report has a first serving cell index and the second CSI report has a second serving cell index, and wherein the processing circuitry is further configured to:
if the first reporting type and the second reporting type have a same priority, then drop the first CSI report if the first serving cell index has a lower priority than the second serving cell index and the second serving cell index have a same priority, then drop the first CSI report if the second CSI sub-frame set has a higher priority than the first CSI sub-frame set.

20. The UE of claim 12, wherein first CSI report has a first serving cell index and the second CSI report has a second serving cell index, and wherein the processing circuitry is further configured to:
if the first reporting type and the second reporting type have a same priority, then drop the first CSI report if the second CSI sub-frame set has a higher priority than the first CSI sub-frame set;
otherwise if the first CSI sub-frame set and the second CSI sub-frame set have a same priority, then drop the first CSI report if the first serving cell index has a lower priority than the second serving cell index.

21. The UE of claim 12, wherein first CSI report has a first CSI process index and the second CSI report has a second CSI process index, and wherein the processing circuitry is further configured to:
if the first reporting type and the second reporting type have a same priority, then drop the first CSI report if the first CSI process index has a lower priority than the second CSI process index;
otherwise if the first CSI process index and the second CSI process index have a same reporting priority, then drop the first CSI report if the second CSI sub-frame set has a higher priority than the first CSI sub-frame set.

22. The UE of claim 12, wherein first CSI report has a first CSI process index and the second CSI report has a second CSI process index, and wherein the processing circuitry is further configured to:
if the first reporting type and the second reporting type have a same priority, then drop the first CSI report if the second CSI sub-frame set has a higher priority than the first CSI sub-frame set;
otherwise if the first CSI process index and the second CSI process index have a same reporting priority, then drop the first CSI report if the first CSI process index has a lower priority than the second CSI process index.

23. A non-transitory computer readable storage medium that stores instructions for execution by one or more processors of a user equipment (UE), comprising:
sending a feedback including at least a first channel status information (CSI) report and a second CSI report in a physical uplink control channel (PUCCH), wherein the first CSI report has a first reporting type and a first CSI sub-frame set, and the second CSI report has a second reporting type and a second CSI sub-frame set; and
dropping the first CSI report if the second CSI sub-frame set has a higher priority than the first CSI sub-frame set if the first reporting type and the second reporting type have a same priority, wherein the first CSI report and the second CSI report are generated at least for one or more of carrier aggregation and Coordinated Multi-Point (CoMP) system.

24. The non-transitory computer readable storage medium of claim 23, wherein the processing circuitry is further configured to drop the first CSI if it was determined to drop the first CSI report.

25. The non-transitory computer readable storage medium of claim 23, wherein the UE is in a transmission mode of 1-9 and wherein the UE is configured with tddModeAConfig-r12.

26. The non-transitory computer readable storage medium of claim 23, wherein the first CSI report has a first CSI process index and the second CSI report has a second process index, and wherein the processing circuitry is further configured to:
drop the first CSI report if the second CSI sub-frame set has a higher priority than the first CSI sub-frame set if the first reporting type and the second reporting type have a same priority, and if the first CSI process index and the second CSI process index have a same priority.

27. The non-transitory computer readable storage medium of claim 26, wherein the UE is in a transmission mode 10 and the UE is configured with a higher layer parameter tddModeAConfig-r12, and the UE is configured with csi-ProcessID-r11 or CSI process index, and wherein the first sub-frame is a 1 and the second sub-frame is a 0.

28. The non-transitory computer readable storage medium of claim 23, wherein the first CSI sub-frame set and the second CSI sub-frame set are each one of a group comprising:
0 and 1.

29. The non-transitory computer readable storage medium of claim 28, wherein the second CSI sub-frame set has a higher priority if the first CSI sub-frame set is 1 and the second CSI sub-frame set is 0.

30. The non-transitory computer readable storage medium of claim 23, wherein the processing circuitry is further configured to drop the first CSI report if the first report type has a lower priority than the second reporting type.

31. The non transitory computer readable storage medium of claim 23, wherein first CSI report has a first serving cell index and the second CSI report has a second serving cell index, and wherein the processing circuitry is further configured to:
if the first reporting type and the second reporting type have a same priority, then drop the first CSI report if the first serving cell index has a lower priority than the second serving cell index and the second serving cell index have a same priority, then drop the first CSI report if the second CSI sub-frame set has a higher priority than the first CSI sub-frame set.

32. The non-transitory computer readable storage medium of claim 23, wherein first CSI report has a first serving cell index and the second CSI report has a second serving cell index, and wherein the processing circuitry is further configured to:
if the first reporting type and the second reporting type have a same priority, then drop the first CSI report if the second CSI sub-frame set has a higher priority than the first CSI sub-frame set;

otherwise if the first CSI sub-frame set and the second CSI sub-frame set have a same priority, then drop the first CSI report if the first serving cell index has a lower priority than the second serving cell index.

33. The non-transitory computer readable storage medium of claim 23, wherein first CSI report has a first CSI process index and the second CSI report has a second CSI process index, and wherein the processing circuitry is further configured to:
   if the first reporting type and the second reporting type have a same priority, then drop the first CSI report if the first CSI process index has a lower priority than the second CSI process index;
   otherwise if the first CSI process index and the second CSI process index have a same reporting priority, then drop the first CSI report if the second CSI sub-frame set has a higher priority than the first CSI sub-frame set.

34. The non-transitory computer readable storage medium of claim 23, wherein first CSI report has a first CSI process index and the second CSI report has a second CSI process index, and wherein the processing circuitry is further configured to:
   if the first reporting type and the second reporting type have a same priority, then drop the first CSI report if the second CSI sub-frame set has a higher priority than the first CSI sub-frame set;
   otherwise if the first CSI process index and the second CSI process index have a same reporting priority, then drop the first CSI report if the first CSI process index has a lower priority than the second CSI process index.

* * * * *